United States Patent
Sarkar et al.

(10) Patent No.: US 12,504,858 B2
(45) Date of Patent: Dec. 23, 2025

(54) METHOD AND SYSTEM FOR IMPROVING USER EXPERIENCE FOR ACCESSING CONTENT ON A USER INTERFACE

(71) Applicant: Samsung Electronics Co., Ltd., Suwon-si (KR)

(72) Inventors: Amit Sarkar, Bengaluru (IN); Shobhit Mathur, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 18/456,155

(22) Filed: Aug. 25, 2023

(65) Prior Publication Data

US 2024/0045558 A1 Feb. 8, 2024

Related U.S. Application Data

(63) Continuation of application No. PCT/KR2023/010668, filed on Jul. 24, 2023.

(30) Foreign Application Priority Data

Jul. 30, 2022 (IN) .............................. 202241043731

(51) Int. Cl.
*G06F 3/0481* (2022.01)
*G06F 3/0485* (2022.01)
(Continued)

(52) U.S. Cl.
CPC .......... *G06F 3/0481* (2013.01); *G06F 3/0485* (2013.01); *G06F 40/106* (2020.01); *G06F 40/30* (2020.01)

(58) Field of Classification Search
CPC .... G06F 3/0481; G06F 3/0485; G06F 40/106; G06F 40/30; G06F 3/04842; G06F 3/0488; G06F 9/451
See application file for complete search history.

(56) References Cited

U.S. PATENT DOCUMENTS 8,255,793 B2   8/2012   Chakrabarti et al.
9,003,277 B2   4/2015   Wan
(Continued)

FOREIGN PATENT DOCUMENTS

WO   2014/059324 A1   4/2014

OTHER PUBLICATIONS

International Search Report dated Nov. 8, 2023, issued in International Application No. PCT/KR2023/010668.
(Continued)

*Primary Examiner* — Asher D Kells
(74) *Attorney, Agent, or Firm* — Jefferson IP Law, LLP

(57) ABSTRACT

A method for improving user experience for accessing content on a user interface (UI) of an electronic device is provided. The method includes identifying a plurality of segments associated with content being accessed by the user on the UI of the electronic device in real-time, recognizing one or more topics of the content in each of the plurality of segments, determining a current topic of interest from the one or more topics of the content by monitoring a user interaction with at least two segments from the plurality of segments, and generating a modified view of the UI with the at least two segments, from the plurality of segments, comprising a plurality of portions associated with the current topic of interest.

23 Claims, 19 Drawing Sheets

(51) Int. Cl.
*G06F 40/106* (2020.01)
*G06F 40/30* (2020.01)

(56) References Cited

U.S. PATENT DOCUMENTS

| | | | |
|---|---|---|---|
| 9,329,759 B1* | 5/2016 | Hill | G06F 9/4451 |
| 10,725,645 B2 | 7/2020 | Kashima et al. | |
| 11,615,163 B2* | 3/2023 | Kwatra | G06F 16/9538 |
| | | | 715/234 |
| 2013/0145276 A1 | 6/2013 | Sathish et al. | |
| 2014/0181634 A1* | 6/2014 | Compain | G06F 40/166 |
| | | | 715/234 |
| 2015/0244830 A1* | 8/2015 | Rietveld | G06F 16/9535 |
| | | | 715/745 |
| 2016/0239155 A1* | 8/2016 | Simakov | G06F 3/0481 |
| 2017/0103343 A1 | 4/2017 | Yee et al. | |
| 2017/0185251 A1* | 6/2017 | Jain | G06F 3/0481 |
| 2017/0212874 A1 | 7/2017 | Urban et al. | |
| 2017/0364986 A1 | 12/2017 | Kim | |
| 2018/0196783 A1 | 7/2018 | Dey et al. | |
| 2019/0076741 A1* | 3/2019 | Thompson | A63F 13/35 |
| 2019/0114043 A1 | 4/2019 | Cao | |
| 2020/0201429 A1* | 6/2020 | Gonzales, Jr. | G06F 16/435 |
| 2020/0412790 A1 | 12/2020 | Jain | |
| 2021/0406759 A1 | 12/2021 | Rajesh et al. | |
| 2022/0107726 A1 | 4/2022 | Chow et al. | |

OTHER PUBLICATIONS

Indian Office Action dated May 7, 2025, issued in Indian Application 202241043731.
European Search Report dated May 22, 2025, issued in European Application No. 23850317.1.

* cited by examiner

700

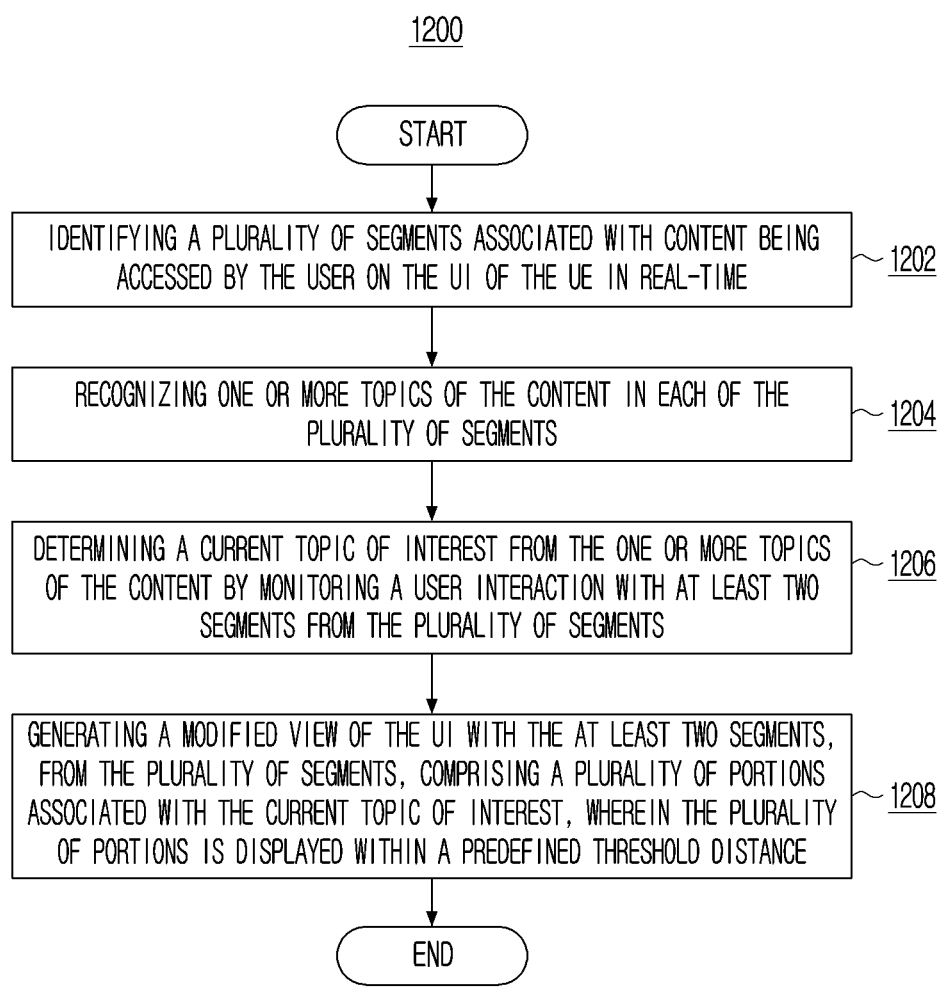

METHOD AND SYSTEM FOR IMPROVING USER EXPERIENCE FOR ACCESSING CONTENT ON A USER INTERFACE

CROSS-REFERENCE TO RELATED APPLICATION(S)

This application is a continuation application, claiming priority under § 365(c), of an International application No. PCT/KR2023/010668, filed on Jul. 24, 2023, which is based on and claims the benefit of an Indian patent application number 202241043731, filed on Jul. 30, 2022, in the Indian Intellectual Property Office, the disclosure of which is incorporated by reference herein in its entirety.

TECHNICAL FIELD

The disclosure relates to field of monitoring content consumption. More particularly, the disclosure relates to a method and system for improving user experience for accessing content on a user interface.

BACKGROUND ART

Traditionally, diverse sub-topics can be present in a long webpage or an application content, such as e-commerce sites/apps, large documents, educational websites, product review sites, news articles, travel app/sites, video sites/apps, or the like. Only a portion of page can be made visible in a browser or an application at a time due to limited viewport window (visible screen area). Users need to scroll/tap back and forth to access and view related content in same webpage. In an example scenario, user searches for a smartphone's display screen feature details in the webpage of an e-commerce site. The user checks specification details at one place, and then tries to find related review comments. This will require lots of additional out-of-order scroll jumps or input interaction by the user as information about one feature or sub-topic is scattered across the whole page. In another example, the user may want to have a view of another smart phone's camera review description along with sub-section of video talking about it. However, the user cannot access both simultaneously.

Presently, complete content of a large scrollable website may not fit in a visible screen area even on large screen devices. In the above mentioned example scenario, User might have to perform recurring back and forth scrolling to read information about sub-topics of smartphone like camera, battery, display, or the like, which are scattered across the page. User needs to do a lot of interactions to get individual sub-topic related content. This visual and navigational complexity causes inconvenience for the user, degrading his browsing experience.

Currently related art solutions disclose methods presenting or re-organizing one specific resource from webpage content in browser to another window, based on the resource attribute information (image, video, audio, animation, text, or the like).

Other related art solutions relate to methods to identify position information of a sub-window over the main window such that a webpage displayed in main window does not get hindered because of the sub-window. This idea is mainly about positioning of additional information on top of a webpage which continues to display even during scroll of the main page content.

A few other related art solutions disclose methods that provides mechanism of segmenting webpage content using visual and structural aspects. Here the segmentation is not done based on actual meaning of content or topic level information, and instead, the content is segmented into blocks based on visual or structural properties, such as header, footer, navigation, advertisement and the like.

However, none of the above related art solutions provide a method for combining content on a user interface based on a user requirement, that is, the content cannot be re-arranged in a way that user desires so as to display the content related to similar topic with one another. Accordingly, there is a need of an automated solution which can allow user to have parallel consumption of related sub-topical content from the same webpage, thereby reducing user effort in unwanted switching across different parts of lengthy content.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a method and system for improving user experience for accessing content on a user interface.

Additional aspects will be set forth in part in the description which follows and, in part, will be apparent from the description, or may be learned by practice of the presented embodiments.

In accordance with an aspect of the disclosure, a method for improving user experience for accessing content on a user interface (UI) of an electronic device is provided. The method includes identifying a plurality of segments associated with content being accessed by the user on the UI of the electronic device in real-time. The method includes recognizing one or more topics of the content in each of the plurality of segments. The method includes determining a current topic of interest from the one or more topics of the content by monitoring a user interaction associated with at least two segments from the plurality of segments. The method further includes generating a modified view of the UI comprising a plurality of portions associated with the current topic of interest from the at least two segments, wherein he plurality of portions is displayed within a predefined threshold distance.

In accordance with another aspect of the disclosure, a system for improving user experience for accessing content on a UI of an electronic device is provided. The system includes a content understanding engine configured to identify a plurality of segments associated with content being accessed by the user on the UI of the electronic device in real-time, a sub-topical semantic segmentation engine configured to recognize one or more topics of the content in each of the plurality of segments, a user attention monitoring engine configured to determine a current topic of interest from the one or more topics of the content by monitoring a user interaction associated with at least two segments from the plurality of segments, and a content rendering engine configured to generate a modified view of the UI comprising a plurality of portions associated with the current topic of interest from the at least two segments, wherein the plurality of portions is displayed within a predefined threshold distance.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 12 illustrates a flow diagram depicting a method for improving user experience for accessing content on a UI of an electronic device according to an embodiment of the disclosure.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Figure 1:
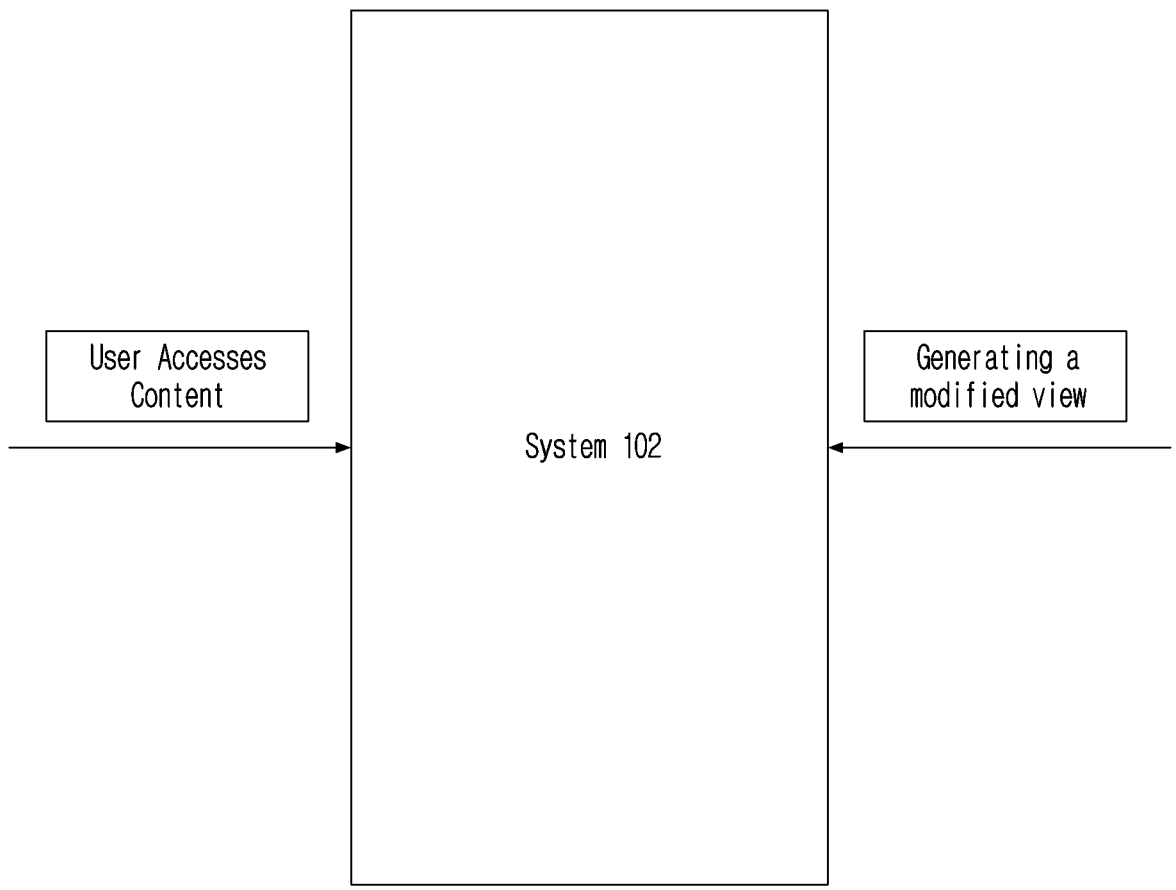
FIG. 1 illustrates a system configured to improve a user experience for accessing content on a user interface (UI) of an electronic device, according to an embodiment of the disclosure.

FIG. 1 illustrates a system configured to improve a user experience for accessing content on a user interface (UI) of an electronic device, according to an embodiment of the disclosure.

Referring to FIG. 1, a system 102 may be based on a personalized learning model configured to improve one or more of a readability and a visibility of the content displayed on the UI. The system 102 may be configured to improve the consumption of the content resulting in an improvement of the user experience for a user through a content correlation and a user attention. The system 102 may be configured to improve the user experience by modifying the UI displaying content accessed by a user. The modification of the UI may be based on monitoring an interaction of the user with the content and determining the user attention. In an embodiment of the disclosure, the UI may be associated with one of a webpage, a website, and a smartphone application. Examples of the electronic device may include, but are not limited to, a smartphone, a personal computer (PC), a laptop, a smart watch, a tablet, or any other device capable of displaying the webpage, the web content or the smartphone application. The modification of the content may include re-arranging of the content of the webpage that is visible on a display interface at a time to be viewed by the user, such as re-arranging of one part of the content from one location of the web page to another location. In an embodiment of the disclosure, re-arranging may include highlighting, increase a size of a segment including the content the user desires to view. Further, the content may be modified by correlating a number of segments of the content with one another based on the interaction and the user attention. Moving ahead, the content may be displayed to the user according to a personal preference of the user upon modification.

According to an aspect of the disclosure, the system 102 may be configured to identify the number of segments associated with the content being accessed by the user on the UI of the electronic device. The number of segments may be identified in real-time while the content is being accessed. In an embodiment of the disclosure, each segment amongst the number of segments may describe a different type of content. In an embodiment of the disclosure, the user may be accessing a webpage generated to provide specifications and reviews for a number of electronic devices. Each segment amongst the number of segments may be associated with an electronic device amongst the number of electronic devices. In another embodiment of the disclosure, the content on the webpage may be associated with features of the electronic device and the content may include information related to hardware features, processing speed, a body of the electronic device, reviews for the electronic device, a video describing the features and a working of the electronic device, and a number of images of the electronic device.

Continuing with the above embodiment of the disclosure, the system 102 may be configured to identify one or more topics of the content. The one or more topics of the content may be present in the number of segments. Each topic amongst the one or more topics may cover a different aspect of the content. In an embodiment of the disclosure, the one or more topics may be a number of different features of an electronic device on a webpage, a website or an application on a smartphone.

Subsequent to identifying the one or more topics, the system 102 may be configured to determine a current topic of interest of the user from the one or more topics. The system 102 may be configured to determine the current topic of interest by monitoring a user interaction related to at least two segments from the number of segments. The current topic of interest may be a topic present in the at least two segments being accessed by the user. The current topic of interest may be the topic accessed by the user from the one or more topics such that the user is preferring to access the current topic of interest from the one or more topics.

In response to determining the current topic of interest of the user, the system 102 may be configured to generate a modified view of the UI with the at least two segments from the number of segments, The modified view may include a number of portions associated with the current topic of interest. The modified view may be generated such that the content related to the current topic of interest is given a higher percentage of space on the UI with respect to the content related to other topics amongst the one or more topics. The number of portions may be displayed within a predefined threshold distance within one another on the UI. For example, two segments from the number of segments related to a similar topic may be presented next to each other on the modified UI which were earlier displayed apart, which required the user to scroll the display UI to read the two topics.

Figure 2:
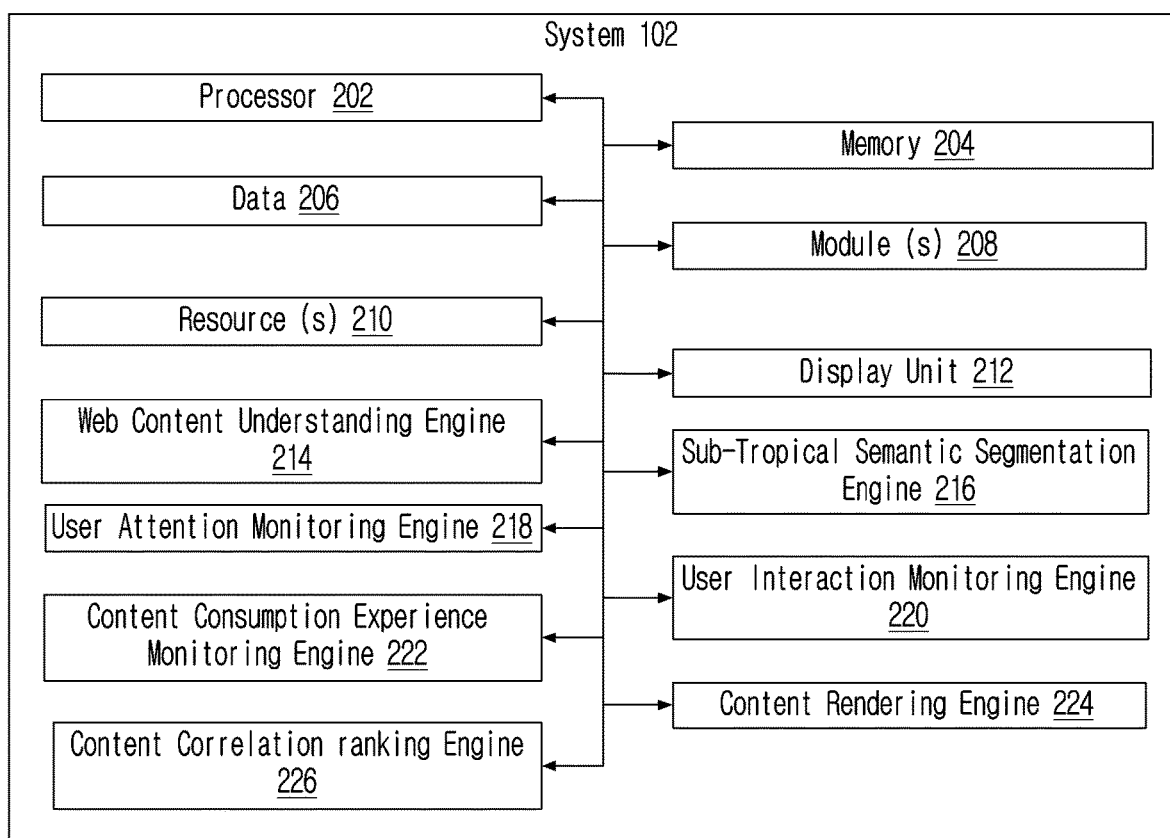
FIG. 2 illustrates a schematic block diagram of the system configured to improve a user experience for accessing content on a UI of an electronic device, according to an embodiment of the disclosure.

FIG. 2 illustrates a schematic block diagram 200 of a system configured to improve a user experience for accessing content on a UI of an electronic device, according to an embodiment of the disclosure. The system 102 may be based on a personalized learning model configured to improve one or more of a readability and a visibility of the content displayed on the UI.

Referring to FIG. 2, continuing with the above embodiment of the disclosure, a personalization may be achieved for the user as the system 102 may learn from past interactions and preferences of the user. The system 102 may be configured to learn preferences of the user and may consider the same while generating a modified UI. Upon generating the modified UI, if the system 102 determines that the user experience may further be improved, the system 102 may learn from previous user interactions and feedback to update one or more learning parameters and personalizes the UI.

The system 102 may be configured to detect a current topic of interest of a user based on an interaction of the user with the UI of one of a webpage, a website. And an application on smartphone including one or more topics of the content. The system 102 may be configured to estimate a degradation of the user experience due to unavoidable user interaction. The unavoidable user interaction may arise from a frequent user attention movement between a number of portions of the content on the webpage. The system 102 may be configured to identify a number of segments and at least two segments amongst the number of segments correlated with one another. The at least two segments may include the current topic of interest of the user from the content on the webpage. The system 102 may be configured to select a number of portions of the content covering the current topic of interest based on a semantic correlation to the at least two segments. Further, the system 102 may be configured to present the number of portions in parallel for simultaneous display of the content. In an embodiment of the disclosure, the system 102 may be configured to monitor a continuous change in a user attention with respect to the content and update the content for parallel display improving the user experience.

The system 102 may include a processor 202, a memory 204, data 206, module(s) 208, resource(s) 210, a display unit 212, a content understanding engine 214, a sub-topical semantic segmentation engine 216, a user attention monitoring engine 218, a user interaction monitoring engine 220, a content consumption experience monitoring engine 222, a content rendering engine 224, and a content correlation ranking engine 226.

In an embodiment of the disclosure, the processor 202, the memory 204, the data 206, the module(s) 208, the resource(s) 210, the display unit 212, the content understanding engine 214, the sub-topical semantic segmentation engine 216, the user attention monitoring engine 218, the user interaction monitoring engine 220, the content consumption experience monitoring engine 222, the content rendering engine 224, and the content correlation ranking engine 226 may be communicatively coupled to one another.

As would be appreciated, the system 102, may be understood as one or more of a hardware, a software, a logic-based program, a configurable hardware, and the like. In an example, the processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data stored in the memory 204.

In an example, the memory 204 may include any non-transitory computer-readable medium known in the art including, for example, a volatile memory, such as a static random access memory (SRAM) and/or a dynamic random access memory (DRAM), and/or a non-volatile memory, such as a read-only memory (ROM), an erasable programmable ROM (EPROM), a flash memory, hard disks, optical disks, and/or magnetic tapes. The memory 204 may include the data 206. The data 206 serves, amongst other things, as a repository for storing data processed, received, and generated by one or more of the processor 202, the memory 204, the module(s) 208, the resource(s) 210, the display unit 212, the content understanding engine 214, the sub-topical semantic segmentation engine 216, the user attention monitoring engine 218, the user interaction monitoring engine 220, the content consumption experience monitoring engine 222, the content rendering engine 224, and the content correlation ranking engine 226.

The module(s) 208, amongst other things, may include routines, programs, objects, components, data structures, or the like, which perform particular tasks or implement data types. The module(s) 208 may also be implemented as, signal processor(s), state machine(s), logic circuitries, and/or any other device or component that manipulate signals based on operational instructions.

Further, the module(s) 208 may be implemented in hardware, as instructions executed by at least one processing unit, e.g., processor 202, or by a combination thereof. The processing unit may be a general-purpose processor that executes instructions to cause the general-purpose processor to perform operations or, the processing unit may be dedicated to performing the required functions. In another aspect of the disclosure, the module(s) 208 may be machine-readable instructions (software) which, when executed by a processor/processing unit, may perform any of the described functionalities.

In some example embodiments of the disclosure, the module(s) 208 may be machine-readable instructions (software) which, when executed by a processor 202/processing unit, perform any of the described functionalities.

The resource(s) 210 may be physical and/or virtual components of the system 102 that provide inherent capabilities and/or contribute towards the performance of the system 102. Examples of the resource(s) 210 may include, but are not limited to, a memory (e.g., the memory 204), a power unit (e.g., a battery), a display unit (e.g., the display unit 212), or the like. The resource(s) 210 may include a power unit/battery unit, a network unit, or the like, in addition to the processor 202, and the memory 204.

The display unit 212 may display various types of information (for example, media contents, multimedia data, text data, or the like) to the system 102. The display unit 212 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

Continuing with the above embodiment of the disclosure, the content understanding engine 214 may be configured to identify the number of segments related to the content being accessed by the user on the UI of the electronic device in real-time. In an embodiment of the disclosure, the number of segments may be present on the webpage and the webpage may be displaying configuration of a smart phone. The number of segments may include at least one segments related to a camera, a display, a memory, a processor, a battery, one or more sensors, and one or more essential services of the smart phone being displayed on the webpage.

Moving forward, upon identification of the number of segments by the content understanding engine 214, the sub-topical semantic segmentation engine 216 may be configured to recognize one or more topics of the content in each of the number of segments. In an embodiment of the disclosure, the sub-topical semantic segmentation engine 216 may be configured to perform a semantic analysis of the content to recognize the one or more topics. In another embodiment of the disclosure, the sub-topical semantic segmentation engine 216 may be configured to perform a classification of the content into a set of pre-defined topics to recognize the one or more topics. In yet another embodiment of the disclosure, the sub-topical semantic segmentation engine 216 may be configured to perform a mapping of the content onto a pre-defined ontology of topics associated with the content to recognize the one or more topics.

Subsequent to recognizing the one or more topics by the sub-topical semantic segmentation engine 216, the user attention monitoring engine 218 may be configured to determine a current topic of interest from the one or more topics of the content. The current topic of interest may be determined based on monitoring of a user interaction related to the at least two segments from the number of segments. In an embodiment of the disclosure, the user interaction may be based on at least one action of the user on the UI. The at least one action may include scrolling the UI, such as a backward scroll and a forward scroll at the UI, a typing of an input, skipping of one or more frames in a video comprising the content, a fast forwarding of the video, a swipe distance in a carousal view of the content, a click on a hyperlink, selecting the content, and highlighting the content.

Moving forward, for determining the current topic of interest, the user attention monitoring engine 218 may be configured to extract information associated with a position on the UI and one or more visual characteristics of each of the at least two segments accessed by the user. The user attention monitoring engine 218 may be configured to determine the current topic of interest by applying one or more artificial intelligence (AI) based techniques. In an embodiment of the disclosure, the one or more visual characteristics may indicate a visibility of the at least two segments on the UI as in if a part of any of the at least two segments is overlapped, a font of the content in the at least two segments, and a size of the at least two segments. Upon extracting the information, the user attention monitoring engine 218 may be configured to retrieve user interaction information related to the user interaction with the at least two segments in real-time.

Continuing with the above embodiment of the disclosure, the user attention monitoring engine 218 may be configured to calculate an attention importance score for each of the at least two segments based on the user interaction information, the position on the UI and the one or more visual characteristics of the at least two segments accessed by the user. Further, the user attention monitoring engine 218 may be configured to rank each of the at least two segments to select a top scoring segment. Further, the top scoring segment may be including the current topic of interest.

Further, monitoring the user interaction may be based on monitoring by the user interaction monitoring engine 220 at least one user gesture while accessing the content to identify the at least two segments being accessed by the user. Further, the content consumption experience monitoring engine 222 may be configured to estimate an inconvenience factor. The inconvenience factor may indicate an inconvenience suffered by the user while accessing the at least two segments of the UI.

In continuation with the above embodiment of the disclosure, for estimation of the inconvenience factor, a change in an attention of the user towards the at least two segments may be determined by the user attention monitoring engine 218 followed by monitoring a navigational distance between the at least two segments by the user attention monitoring engine 218. The navigational distance may indicate a level of a user effort in performing the user interaction associated with the at least two segments. In an embodiment of the disclosure, the navigational distance may be related to one or more of a scroll distance between the number of segments, a number of frames in a video displaying the content, a positional distance defining a gap of a number of pixel units between the number of segments, a click distance defining a number of clicks required to move across the number of segments, a search distance defining a number of characters typed to search one or more of the number of segments, and input distance defining a number of key inputs and a number of touch inputs received to access the number of segments.

Moving forward, monitoring the navigational distance may further be based on an identification of a correlation by a content correlation ranking engine 226 between the at least two segments accessed by the user. The identification may be performed to determine if the navigational distance is greater than or equal to a pre-determined threshold. Further, the user attention monitoring engine 218 may be configured to rank the at least two segments accessed by the user based on the correlation between the at least two segments. In response to monitoring of the navigational distance, the content consumption experience monitoring engine 222 may be configured to estimate the inconvenience factor when the navigational distance between the at least two segments is greater than or equal to the pre-determined threshold.

Continuing with the above embodiment of the disclosure, the content correlation ranking engine 226 may be configured to calculate a correlation score related to one or more segments mapped to a similar topic from the one or more topics. The calculation may be based on extracting one or more textual content properties related to textual content in the number of segments from the sub-topical semantic segmentation engine 216. Further, the content correlation ranking engine 226 may be configured to generate a semantic embedding from the textual content. Moving ahead, the content correlation ranking engine 226 may be configured to compute a semantic similarity between each pair of segments embedding vectors. In response to computing, the content correlation ranking engine 226 may be configured to update correlation matrix with each segment presented in rows and columns and each cell capturing the normalized similarity score in K-dimension. A correlation matrix is depicted in Table 1 below that is used for determining the correlation score and a topic segment distribution is described in Table 2.

TABLE 1

|    | S1 | S2 | S3 | S4 |
|----|----|----|----|----|
| S1 | x1 | x2 | x3 | x4 |
| S2 | y1 | y2 | y3 | y4 |
| S3 | z1 | z2 | z3 | z4 |
| S4 | t1 | t2 | t3 | t4 |

Table 1 Depicts a Correlation Matrix Between Different Segments from the Number of Segments

TABLE 2

|         | Segment 1 | Segment 2 | Segment N |
|---------|-----------|-----------|-----------|
| Topic 1 | 1         | 0         | 0         |
| Topic 2 | 0         | 1         | 0         |
| Topic 3 | 0         | 0         | 1         |
| Topic K | 0         | 1         | 0         |

Table 2 Depicts a Topic and Segments Distribution

In response to calculating the correlation score, the user attention monitoring engine 218 may be configured to calculate the rank from the at least two segments accessed by the user. The ranking may be based on identifying at least one other segment from the number of segments belonging to the similar topic with respect to the at least two segments. Further, the content correlation ranking engine 226 may be configured to fetch the correlation scores for each segment, and visual properties related to the at least two segments and compute a visual correlation score for the at least one segment. The segments and visual properties related to the segments corresponding to each sub-topic are depicted in the Table 3 below.

TABLE 3

|  | Segments/sub-topic | Visual properties | Original Visual Ordering |
|---|---|---|---|
| Sub-Topic 1 | S1, S5, S6, S9, S10, . . . | S1: {type: text, dimension: [x, y, w, h]}, S5: {type: video, dimension: [x, y, w, h]}, . . . | S1 -> S6 -> S5 -> S9 -> S10 . . . |
| Sub-Topic 2 | S2, S7, S11, . . . | . . . | S2 -> S7 -> S11 . . . |

Table 3 Depicts Segments Belonging to at Least Two Sub-Topics and Visual Properties of the at Least Two Segments Moving forward, the content correlation ranking engine 226 may be configured to compute a final correlation score for each segment pair by performing a linear combination (ax+by) of semantic (x) and visual (y) correlation scores, a & b are weight factors. Each of the segment pairs may be amongst the at least two segments related to the similar topic being accessed by the user. Based on the final correlation score, a list including the ranks may be generated and sorted in a descending order of the final correlation score. The list is represented in the Table 4 below.

TABLE 4

|  | Current Segment | Ranked list of other correlated segments |
|---|---|---|
| Sub-Topic 1 | S1 | S6, S9, S5, S10 |
|  | S5 | S9, S1, S6, S10 |
| Sub-Topic 2 | S2 | S7, S11, . . . |

Table 4 Depicts the List of Ranks

Subsequent to determination of the current topic of interest by the user attention monitoring engine 218, the content rendering engine 224 may be configured to generate a modified view of the UI with the at least two segments. The at least two segments may include a number of portions related to the current topic of interest. In an embodiment of the disclosure, the number of portions may be displayed within a predefined threshold distance. Displaying each of the number of portions within the predefined threshold distance may indicate that the user is able to view information associated with the current topic of interest in the number of portions on the UI in the generated modified view of the UI. The predefined threshold distance may be associated with a distance on the UI required to display the current topic of interest in the number of portions aligned with one another. Further, generating the modified view may be based on the ranking of the at least two segments such that the number of portions related to the current topic of interest of the user may be displayed within the predefined threshold distance on the UI.

Continuing with the above embodiment of the disclosure, the content rendering engine 224 may be configured to identify the at least two segments including the current topic of interest accessed by the user. Further, the content rendering engine 224 may be configured to fetch a list including the ranking of the at least two segments and context information. In an embodiment of the disclosure, the context information may indicate a content preference and an order preference of the user for each of the number of segments. Furthermore, the content rendering engine 224 may be configured to update segment information related to the number of segments. The update may be performed based on the content preference and the order preference of the user.

In response to updating the segment information, the content rendering engine 224 may be configured to re-rank the at least two segments. Based on the re-ranking, the content rendering engine 224 may be configured to generate the modified view by personalizing the UI based on the re-ranking of the at least two segments.

In an embodiment of the disclosure, the user attention monitoring engine 218 may be configured to dynamically monitor a change in the attention of the user while accessing the content of the at least two segments. Further, the user attention monitoring engine 218 may be configured to re-calculate an updated attention importance score for each of the at least two segments. Based on the re-calculation, the user attention monitoring engine 218 may be configured to update the modified view by personalizing the UI.

In another embodiment of the disclosure, the user interaction monitoring engine 218 may be configured to monitor user feedback related to at least one of a content preference, an order preference and the modified view. Moving ahead, upon monitoring the user feedback, the content consumption experience monitoring engine 222 may be configured to refine one or more parameters related to at least one of the rankings of the at least two segments and one of the modified views and the updated modified view of the at least two segments. Moving forward, the content rendering engine 224 may be configured to update the modified view by personalizing the UI based on the refined one or more parameters.

Figure 3:
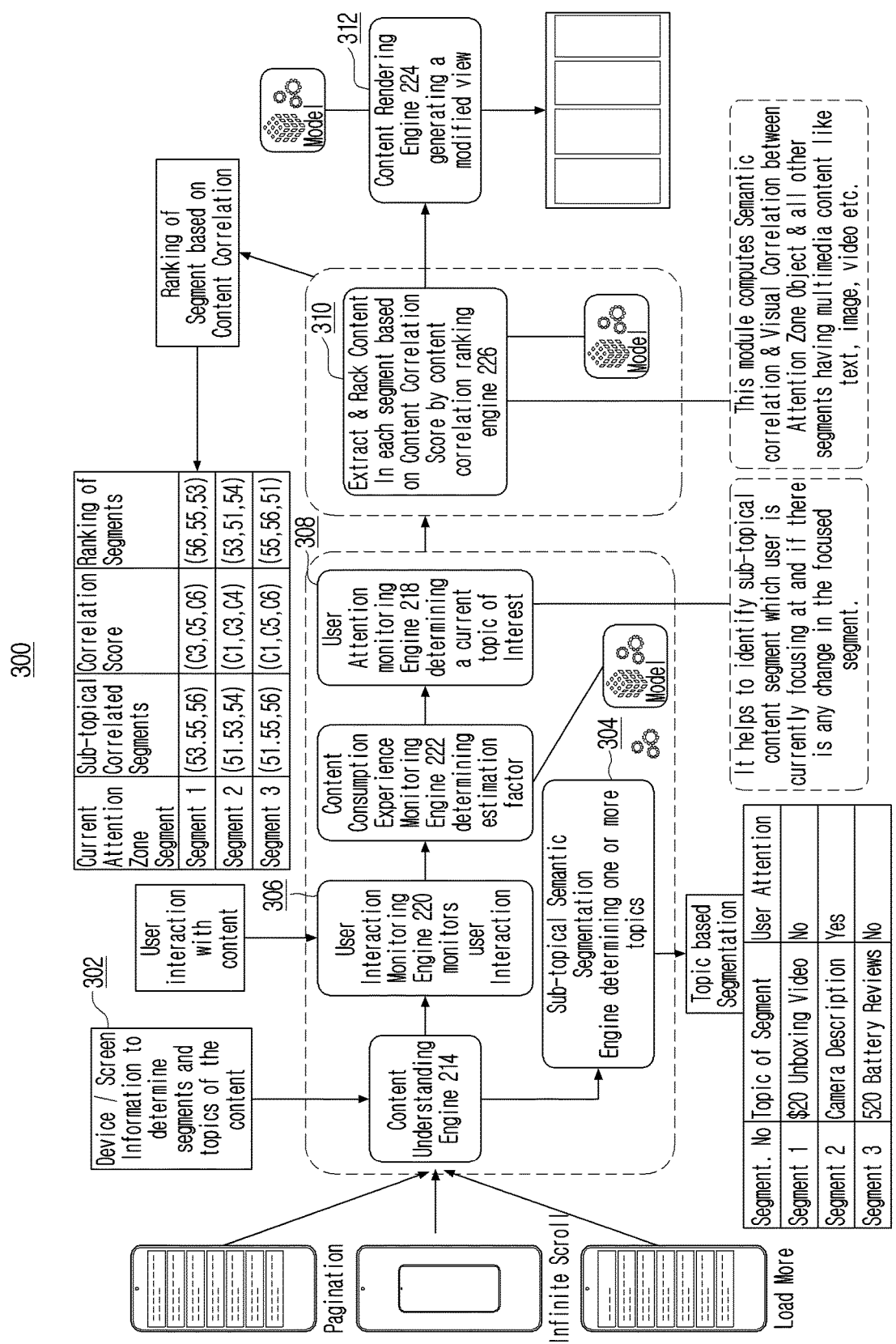
FIG. 3 illustrates an operational flow diagram depicting a process for improving a user experience for accessing content on a UI of an electronic device, according to an embodiment of the disclosure.

FIG. 3 illustrates an operational flow diagram depicting a process 300 for improving a user experience for accessing content on a UI of an electronic device according to an embodiment of the disclosure.

Referring to FIG. 3, the content may be one or more of textual content, visual content, such as an at least one image, at least one video, and a combination of the at least one image, and the at least one video, and a combination of the textual content and the visual content. The content may be displayed on a UI of the electronic device. The UI may be related to a webpage, a website, an application on the smartphone, such as a third-party application or the like. Improving the user experience may indicate assisting a user accessing the content in a way such that desired content by the user is displayed, highlighted on the UI, or combined together on the UI from different parts. The desired content by the user may be determined based on monitoring a user interaction with the UI. The process 300 may performed by the system 102 and the components thereof. The process 300 may be initiated when the user opens a webpage and interacts with the content on the webpage.

Subsequently, the system 102 may be configured to detect a current topic of interest of the user based on the user interaction. The system 102 may be configured to identify a number of segments and at least two segments amongst the number of segments correlated with one another. The at least two segments may be including the current topic of interest of the user from the content on the webpage. The system 102 may be configured to select a number of portions of the content covering the current topic of interest based on a semantic correlation to the at least two segments. Further, the system 102 may be configured to present the number of portions in parallel for simultaneous consumption of the content. In an embodiment of the disclosure, the system 102 may be configured to monitor a continuous change in a user attention with respect to the content and update the content for parallel consumption improving the user experience.

At operation 302, the process 300 may include identifying the number of segments related to the content being accessed by the user present on the UI in real-time. The identification of the number of segments may be performed by the content understanding engine 214 as referred in the FIG. 2. Identifying the number of segments may include analyzing the content present on the UI and determining whether the content includes diverse topics that can be grouped into the one or more topics presented in the number of segments. The number of segments may include the at least one portion from the number of portions related to a topic from the one or more topics such that each segment may include the one or more topics.

In an embodiment of the disclosure, the content understanding engine 214 may further be configured to assess an accessibility of the number of segments belonging to a common topic from the one or more topics by measuring a distance between the number of segments and visibility of such portions simultaneously within the visible viewport given the default presentation of the content.

In an embodiment of the disclosure, each segment amongst the number of segments may describe a different type of content. In an embodiment of the disclosure, the user may be accessing a webpage generated to provide specifications and reviews for a number of electronic devices. Each segment amongst the number of segments may be associated with an electronic device amongst the number of electronic devices. In another embodiment of the disclosure, the content on the webpage may be associated with features of the electronic device and the content may include information related to hardware features, processing speed, a body of the electronic device, reviews for the electronic device, a video describing the features and a working of the electronic device, a number of images of the electronic device.

At operation 304, the process 300 may proceed towards recognizing the one or more topics of the content upon identification of the number of segments by the content understanding engine 214. The one or more topics may be represented by the number of segments on the UI. The recognition of the one or more topics may be performed by the sub-topical semantic segmentation engine 216 as referred in the FIG. 2. In an embodiment of the disclosure, the process 300 may include performing a semantic analysis of the content to recognize the one or more topics. In another embodiment of the disclosure, the process 300 may include performing a classification of the content into a set of pre-defined topics to recognize the one or more topics. In yet another embodiment of the disclosure, the process 300 may include performing a mapping of the content onto a pre-defined ontology of topics associated with the content to recognize the one or more topics.

At operation 306, the process 300 may include monitoring the user interaction with the content subsequent to recognizing the one or more topics by the sub-topical semantic segmentation engine 216. The monitoring may be performed by the user interaction monitoring engine 220 as referred in the FIG. 2. The user attention monitoring engine 218 may be configured to identify different types of user interaction required if the user intends to access different portions of the content in an order not presented by default on the UI. In an embodiment of the disclosure, the user interaction may be based on at least one action of the user on the UI. The at least one action may include scrolling the UI, such as a backward scroll and a forward scroll at the UI, a typing of an input, skipping of one or more frames in a video comprising the content, a fast forwarding of the video, a swipe distance in a carousal view of the content, a click on a hyperlink, selecting the content, and highlighting the content.

Continuing with the above embodiment of the disclosure, monitoring the user interaction may include identifying at least two segments amongst the number of segments being accessed by the user by monitoring at least one user gesture while accessing the content. Examples of the at least one gesture may include, but are not limited to, a hand gesture, a finger gestures while touching the UI. The at least one gesture may further be based on movement of an eye of the user. The movement of the eye may be monitored to detect a change of a focus of the user on the UI. The identification may be performed by the user interaction monitoring engine 220. Further, monitoring may include estimating an inconvenience factor indicating an inconvenience suffered by the user while accessing the at least two segments of the UI. The estimation may be calculated by the content consumption experience monitoring engine 222 as referred in the FIG. 2 with an assistance from the user interaction monitoring engine 220 and the user attention monitoring engine 218 as referred in the FIG. 2. For estimation of the inconvenience factor, the user attention monitoring engine 218 may be configured to determine a change in an attention of the user towards the at least two segments.

Further, the user interaction monitoring engine 220 may be configured to monitor a navigational distance between the at least two segments with an assistance from the content correlation ranking engine 226 as referred in the FIG. 2. In an embodiment of the disclosure, the navigational distance may be related with one or more of a scroll distance between the number of segments, a number of frames in a video displaying the content, a positional distance defining a gap of a number of pixel units between the number of segments, a click distance defining a number of clicks required to move across the number of segments, a search distance defining a number of characters typed to search one or more of the number of segments, and input distance defining a number of key inputs and a number of touch inputs received to access the number of segments.

Subsequently, monitoring the navigational distance may include identifying a correlation between the at least two segments accessed by the user to determine if the navigational distance is greater than or equal to a pre-determined threshold for correlated content. The correlation may be identified by the content correlation ranking engine 226. Further, the user attention monitoring engine 218 may be configured to rank the at least two segments accessed by the user based on the correlation between the at least two segments. Further, the process 300 may include estimating the inconvenience factor when the navigational distance between the at least two segments is greater than or equal to a pre-determined threshold.

At operation 308, the process 300 may include determining the current topic of interest from the one or more topics of the content, subsequent to monitoring the user interaction. The determination may be made by the user attention monitoring engine 218 as referred in the FIG. 2. The current topic of interest may be determined based on monitoring of the user interaction with the at least two segments from the number of segments. Moving forward, for determining the current topic of interest, the process 300 may include extracting information associated with a position on the UI and one or more visual characteristics of each of the at least two segments accessed by the user. In an embodiment of the disclosure, the one or more visual characteristics may indicate a visibility of the at least two segments on the UI as in if a part of any of the at least two segments is overlapped, a font of the content in the at least two segments, and a size of the at least two segments. Upon extracting the information, the process 300 may include retrieving user interaction information related to the user interaction with the at least two segments in real-time. Further, the process 300 may include calculating by the user attention monitoring engine 218, an attention importance score for each of the at least two segments based on the user interaction information, the position on the UI and the one or more visual characteristics of the at least two segments accessed by the user.

At operation 310, the process 300 may include ranking the at least two segments by the user attention monitoring engine 218 226 as referred in the FIG. 2 to select a top scoring segment. Further, the top scoring segment may be including the current topic of interest. The ranking may be based on a semantic correlation and a visual correlation between an attention zone object and other segments having multimedia content like, such as text, image, video or the like. In an embodiment of the disclosure, an attention including the attention zone object may be a segment from the number of segments with a current attention of the user. Continuing with the above embodiment of the disclosure, the segment may be amongst the at least two segments.

Continuing with the above embodiment of the disclosure, the content correlation ranking engine 226 may be configured to calculate the correlation score related to one or more segments mapped to a similar topic from the one or more topics. The calculation may be based on extracting one or more textual content properties related to textual content in the number of segments from the sub-topical semantic segmentation engine 216. Further, the content correlation ranking engine 226 may be configured to generate a semantic embedding from the textual content. Moving ahead, the content correlation ranking engine 226 may be configured to compute a semantic similarity between each pair of segments embedding vectors. In response to computing, the content correlation ranking engine 226 may be configured to update correlation matrix with each segment presented in rows and columns and each cell capturing the normalized similarity score in K-dimension.

In response to calculating the correlation score, the user attention monitoring engine 218 may be configured to calculate the rank from the at least two segments accessed by the user. The ranking may be based on identifying at least on other segment from the number of segments belonging to the similar topic with respect to the at least two segments. Further, the content correlation ranking engine 226 may be configured to fetch the correlation scores for each segment, and visual properties related to the at least two segments and compute a visual correlation score for the at least one segment.

Moving forward, the content correlation ranking engine 226 may be configured to compute a final correlation score for each segment pair by doing a linear combination (ax+by) of semantic (x) and visual (y) correlation scores, a & b are weight factors. Each of the segment pairs may be amongst the at least two segments related to the similar topic being accessed by the user. Based on the final correlation score, a list including the ranks may be generated and sorted in a descending order of the final correlation score.

Subsequent to determination of the current topic of interest by the user attention monitoring engine 218, the content rendering engine 224 may be configured to generate a modified view of the UI with the at least two segments. The at least two segments may include a number of portions related to the current topic of interest. In an embodiment of the disclosure, the number of portions may be displayed within the predefined threshold distance. Displaying each of the number of portions within the predefined threshold distance may indicate that the user is able to view information associated with the current topic of interest in the number of portions on the UI in the generated modified view of the UI. The predefined threshold distance may be associated with a distance on the UI required to display the current topic of interest in the number of portions aligned with one another. Further, generating the modified view may be based on the ranking of the at least two segments such that the number of portions related to the current topic of interest of the user may be displayed within the predefined threshold distance on the UI.

At operation 312, the process 300 may include generating a modified view of the UI with the at least two segments subsequent to determination of the current topic of interest by the user attention monitoring engine 218. The generated modified view of the UI may be configured to reduce the level of user effort in performing the user interaction associated with the at least two segments. The generated modified view of the UE may further be configured to reduce the inconvenience suffered by the user in accessing the content when the change in user attention is more than a pre-defined threshold. The modified view may be generated by the content rendering engine 224 as referred in the FIG. 2. The at least two segments may include a number of portions related to the current topic of interest. In an embodiment of the disclosure, the number of portions may be displayed within the predefined threshold distance. Further, generating the modified view may be based on the ranking of the at least two segments such that the number of portions related to the current topic of interest of the user may be displayed within the predefined threshold distance on the UI.

Continuing with the above embodiment of the disclosure, the content rendering engine 224 may be configured to identify the at least two segments including the current topic of interest accessed by the user. Further, the content rendering engine 224 may be configured to fetch a list including the ranking of the at least two segments and context information. In an embodiment of the disclosure, the context information may indicate a content preference and an order preference of the user for each of the number of segments. Furthermore, the content rendering engine 224 may be configured to update segment information related to the number of segments. The update may be performed based on the content preference and the order preference of the user. In response to updating the segment information, the content rendering engine 224 may be configured to re-rank the at least two segments. Based on the re-ranking, the content rendering engine 224 may be configured to generate the modified view by personalizing the UI based on the re-ranking of the at least two segments.

In an embodiment of the disclosure, the user attention monitoring engine 218 may be configured to dynamically monitor a change in the attention of the user while accessing the content of the at least two segments. Further, the user attention monitoring engine 218 may be configured to re-calculate an updated attention importance score for each of the at least two segments. Based on the re-calculation, the content rendering engine 224 may be configured to update the modified view by personalizing the UI.

In another embodiment of the disclosure, the user interaction monitoring engine 218 may be configured to monitor user feedback related to at least one of a content preference, an order preference and the modified view. Moving ahead, upon monitoring the user feedback, the content consumption experience monitoring engine 222 may be configured to refine one or more parameters related to at least one of the rankings of the at least two segments and one of the modified views and the updated modified view of the at least two segments. Moving forward, the content rendering engine 224 may be configured to update the modified view by personalizing the UI based on the refined one or more parameters.

Figure 4A:
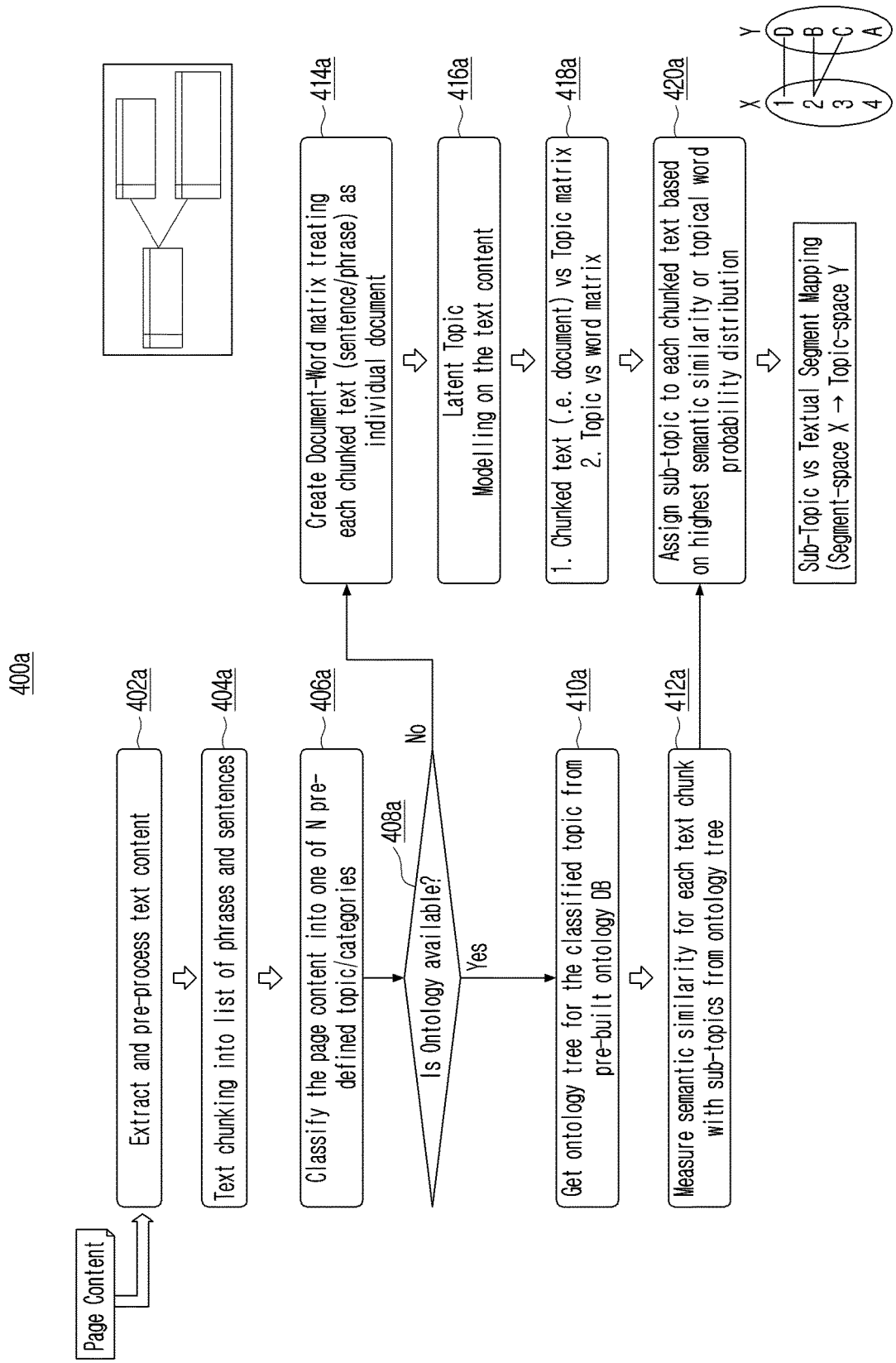
FIG. 4A illustrates an operational flow diagram depicting a process for recognizing one or more topics in a content displayed on a UI of an electronic device and correlating with a number of segments, according to an embodiment of the disclosure.

FIG. 4A illustrates an operational flow diagram depicting a process 400a for recognizing one or more topics in a content displayed on a UI of an electronic device and correlating with a number of segments, according to an embodiment of the disclosure. The content may be textual content and the content may interchangeably be referred as the textual content. In an embodiment of the disclosure, the one or more topics may be recognized by the sub-topical semantic segmentation engine 216 as referred in the FIG. 2.

Referring to FIG. 4A, at operation 402a, the process 400a may include extracting the textual content from the UI. Further, the process 400a may include pre-processing the textual content.

At operation 404a, the process 400a may include chunking the textual content into a list of phrases and sentences.

At operation 406a, the process 400a may include classifying the textual content chunked into the list of phrases and sentences into one of a number of pre-defined topics and a number of categories. In an embodiment of the disclosure, the number of pre-defined topic may be "N".

At operation 408a, the process 400a may include determining whether an ontology related to the textual content is available or not. In an embodiment of the disclosure, where it is determined that the ontology is available, the process 400a proceeds towards operation 410a. In an embodiment of the disclosure, where it is determined that the ontology is unavailable, the process 400a proceeds towards operation 414a.

At operation 410a, the process 400a may include fetching an ontology tree for the number of pre-defined topics from a pre-built ontology database.

At operation 412a, the process 400a may include measuring a semantic similarity for each text chunk generated by chunking the textual content. The text chunk may be one of phrase or sentence from the list of phrases and sentences. Further, the process 400a may proceed towards operation 418a.

At operation 414a, the process 400a may include creating a document-word matrix treating each text chunk as an individual document.

At operation 416a, the process 400a may include performing a topic modelling on the textual content to discover the topics or a hierarchy of topics from the textual content.

At operation 418a, the process 400a may include assigning a sub-topic to each chunked text based on a highest semantic similarity or topical word probability distribution. Each sub-topic may be amongst the one or more topics.

At operation 420a, the process 400a may include performing a mapping of each sub-topic with each textual segment. In an embodiment of the disclosure, the textual segment may be amongst the number of segments.

Figure 4B:
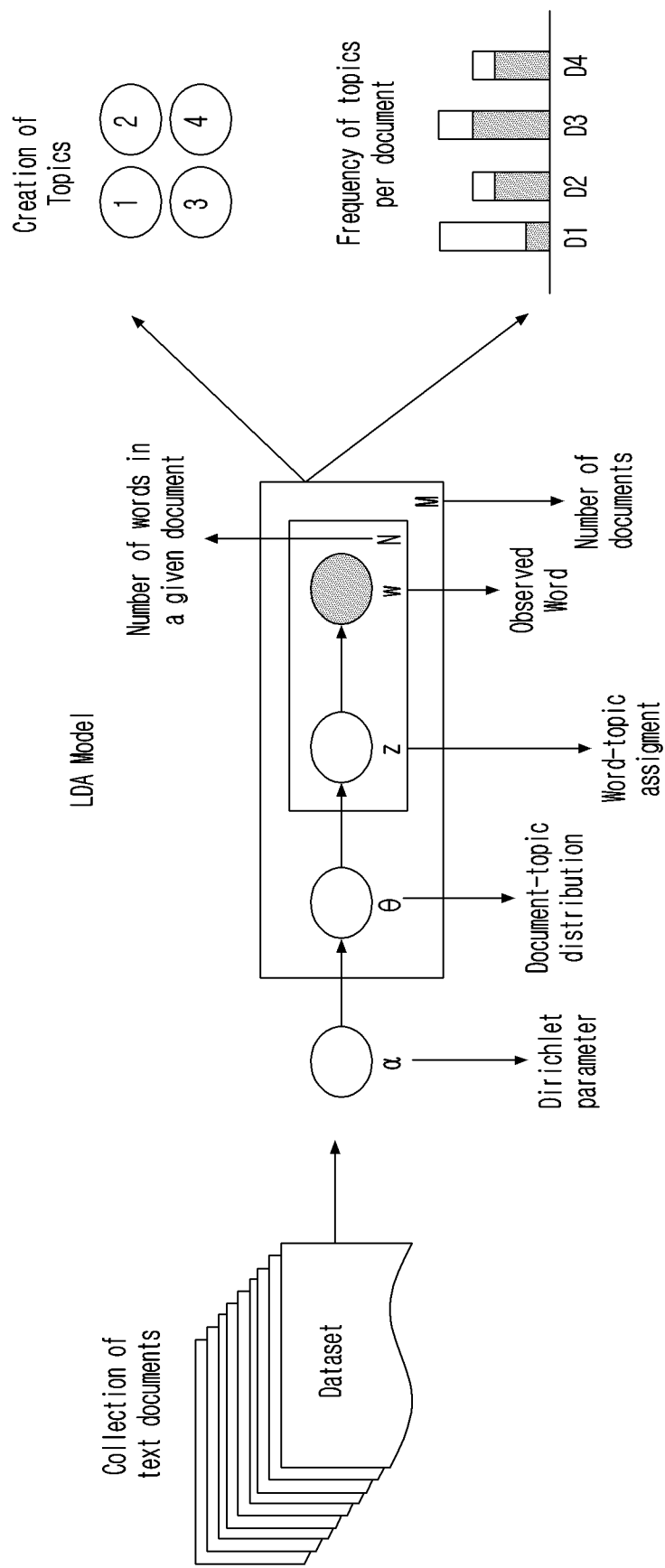
FIG. 4B illustrates an operational flow diagram depicting a latent Dirichlet allocation (LDA) model, according to an embodiment of the disclosure.

FIG. 4B illustrates an operational flow diagram 400b depicting a latent Dirichlet allocation (LDA) model, according to an embodiment of the disclosure.

Referring to FIG. 4B, the LDA model may be an unsupervised topic modelling approach to extract latent topics from a document or text. The LDA model includes a distribution over words in the documents, for example, a document-word matrix. Further, the LDA model may be configured to produce distribution over words in the topics, for example, a topic-word matrix shows every topic as a distribution of words and distribution over topics in documents (i.e., document-topic matrix shows every document as a distribution of topics).

Figure 5A:
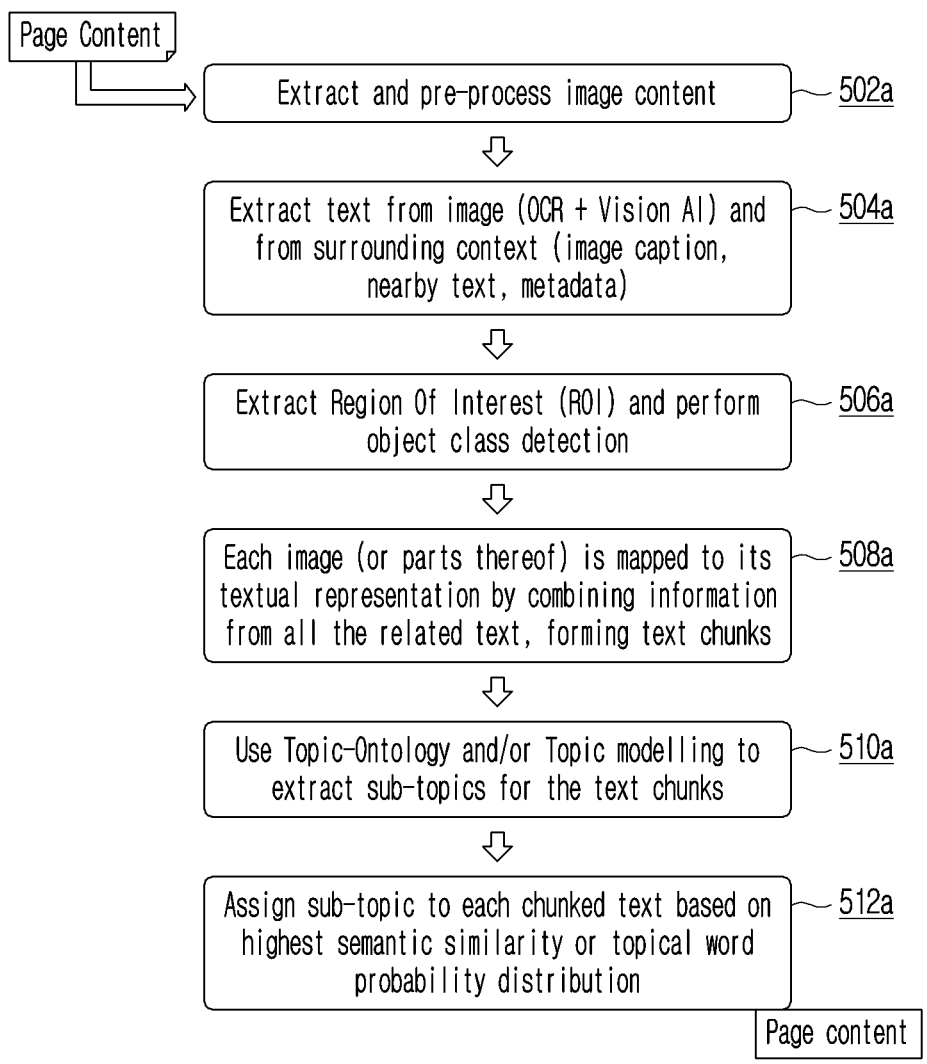
FIG. 5A illustrates an operational flow diagram depicting a process for recognizing one or more topics in a content displayed on a UI of an electronic device, according to an embodiment of the disclosure.

FIG. 5A illustrates an operational flow diagram depicting a process 500a for recognizing one or more topics in a content displayed on a UI of an electronic device, according to an embodiment of the disclosure. In an embodiment of the disclosure, the content may be in the form of an image and interchangeably be referred as image content. In an embodiment of the disclosure, the one or more topics may be recognized by the sub-topical semantic segmentation engine 216 as referred in the FIG. 2.

Referring to FIG. 5A, at operation 502a, the process 500a may include extracting the image content from the UI. Further, the process 500a may include pre-processing the image content.

At operation 504a, the process 500a may include extracting textual information from the image content and surrounding context on the UI, such as an image caption, a nearby text, and metadata. The textual information may be extracted by applying one or more of an optical character recognition (OCR) method and any vision-based artificial intelligence (AI) technology. A textual representation may also be generated using AI-based image captioning method.

At operation 506a, the process 500a may proceed towards extracting a Region of Interest (ROI) from the image content and performing an object class detection.

At operation 508a, the process 500a may include mapping each image or parts of each image from the image content to a textual representation related to it by combining information from the textual representation for forming a number of text chunks.

At operation 510a, the process 500a may include extracting a sub-topic for each text chunk from the number of text chunk by using one or more of a topic ontology and a topic modelling.

At operation 512a, the process 500a may include assigning the sub-topic to each chunked text based on a highest semantic similarity or topical word probability distribution. Each sub-topic may be amongst the one or more topics.

Figure 5B:
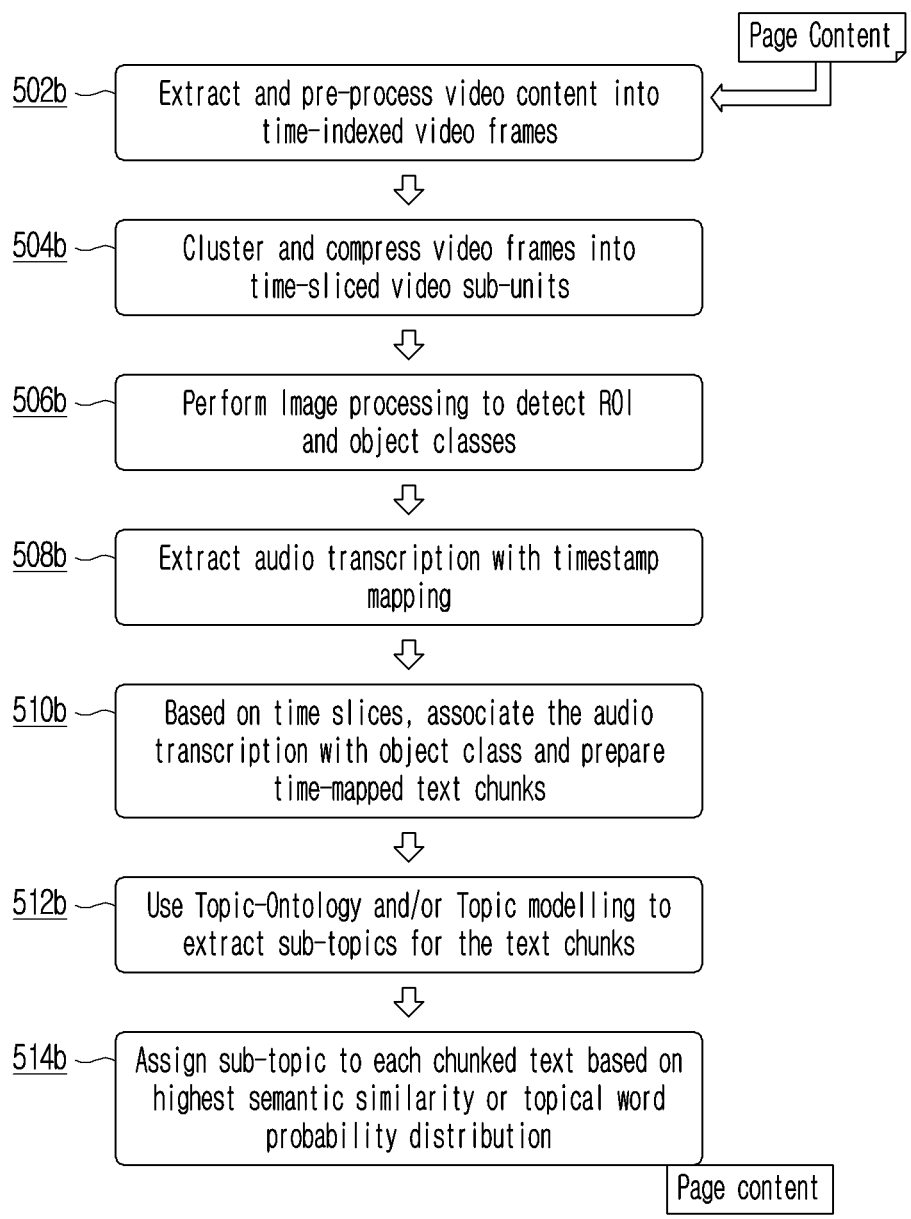
FIG. 5B illustrates an operational flow diagram depicting a process for recognizing one or more topics in the content displayed on the UI of the electronic device when the content is in the form of a video, according to an embodiment of the disclosure.

FIG. 5B illustrates an operational flow diagram depicting a process 500b for recognizing one or more topics in the content displayed on the UI of the electronic device when the content is in the form of a video, according to an embodiment of the disclosure. The content may interchangeably be referred as video content. In an embodiment of the disclosure, the one or more topics may be recognized by the sub-topical semantic segmentation engine 216 as referred in the FIG. 2.

Referring to FIG. 5B, at operation 502b, the process 500b may include extracting and pre-processing the video content into a number of time-indexed video frames.

At operation 504b, the process 500b may include compressing and clustering the number of time-indexed video frames into a number of time-sliced video sub-units.

At operation 506b, the process 500b includes performing an image processing to detect an ROI and an object class related to the video content.

At operation 508b, the process 500b may include extracting an audio transcription from the video content with a timestamp mapping.

At operation 510b, the process 500b may include relating the audio transcription with the object class and preparing a number of time-mapped text chunks. The audio transcription may be related based on a number of time slices.

At operation 512b, the process 500b may include extracting a sub-topic for each text chunk from the number of text chunk by using one or more of a topic ontology and a topic modelling. The text chunk may be related to the audio transcription.

At operation 514b, the process 500b may include assigning the sub-topic to each chunked text based on a highest semantic similarity or topical word probability distribution. Each sub-topic may be amongst the one or more topics.

Figure 5C:
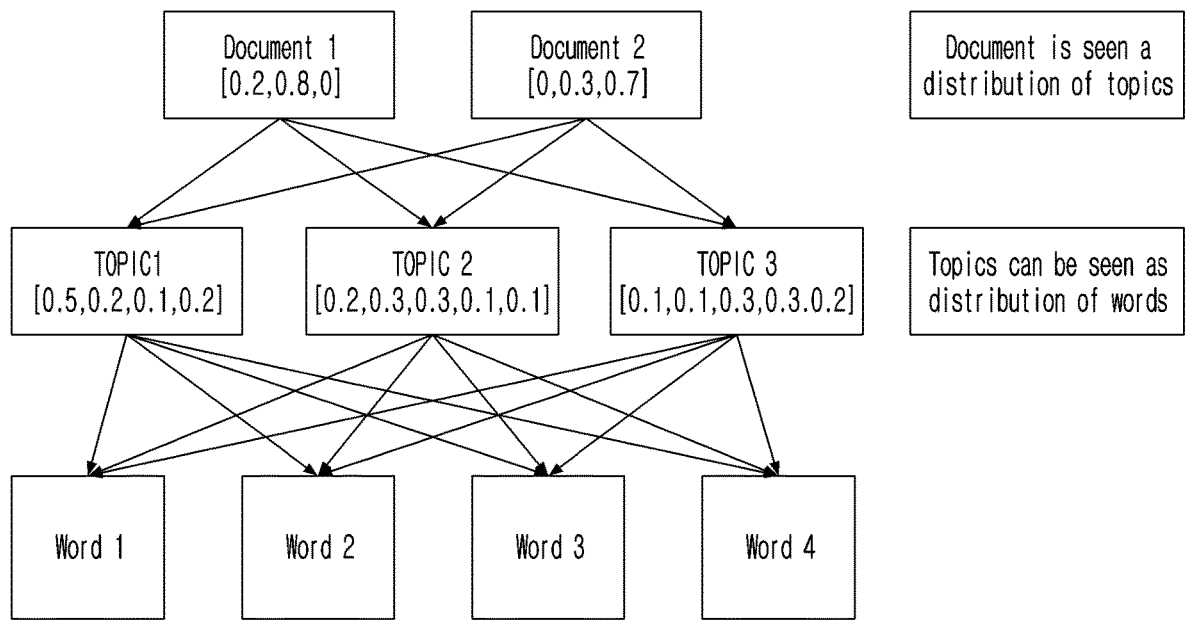
FIG. 5C illustrates a diagram depicting a relation between one or more words, the one or more topics and a document, according to an embodiment of the disclosure.

FIG. 5C illustrates a diagram 500c depicting a relation between one or more words, the one or more topics and a document, according to an embodiment of the disclosure. The document may include a paragraph or a span of texts and sentences. The relation between the one or more words, the one or more topics and the document may indicate that the one or more topics may be a distribution of the one or more words and the document may be a distribution of the one or more topics.

Figure 6:
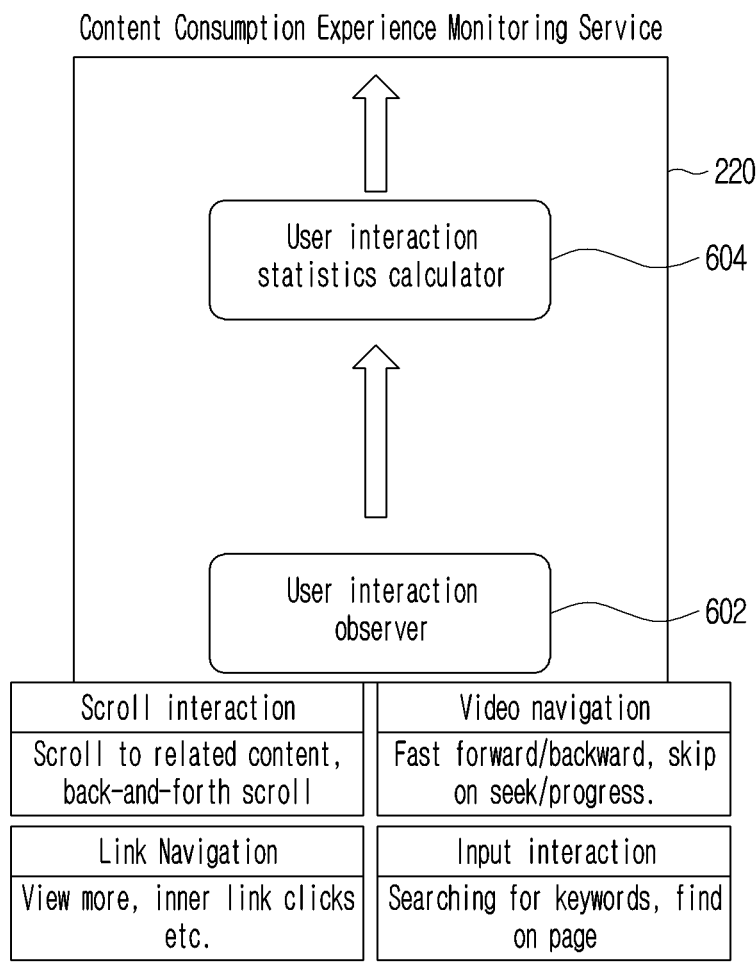
FIG. 6 illustrates a schematic block diagram depicting a user interaction monitoring engine, according to an embodiment of the disclosure.

FIG. 6 illustrates a schematic block diagram 600 depicting a user interaction monitoring engine, according to an embodiment of the disclosure. The user interaction monitoring engine may be the user interaction monitoring engine 220 as referred in the FIG. 2. The user interaction monitoring engine 220 may be configured to monitor a user interaction with content displayed on a UI of an electronic device.

Referring to FIG. 6, continuing with the above embodiment of the disclosure, the user interaction monitoring engine 220 may include a user interaction observer 602, and a user interaction statistics calculator 604. The user interaction observer 602 may be configured to observe the user interaction with the content. The user interaction may be based on at least one action of the user on the UI. The at least one action may include scrolling the UI, such as a backward scroll and a forward scroll at the UI, a typing of an input, skipping of one or more frames in a video comprising the content, a fast forwarding of the video, a swipe distance in a carousal view of the content, a click on a hyperlink, selecting the content, and highlighting the content. Further, the monitoring the user interaction may include identifying at least two segments amongst the number of segments being accessed by the user by monitoring at least one user gesture while accessing the content. Examples of the at least one gesture may include, but are not limited to, a hand gesture, a finger gestures while touching the UI. The at least one gesture may further be based on movement of an eye of the user. The movement of the eye may be monitored to detect a change of a focus of the user on the UI.

Subsequently, the user interaction statistics calculator 604 may be configured to calculate an extent of the user interaction with the content. In an embodiment of the disclosure, the user interaction statistics calculator 604 may be configured to calculate an amount of the scrolling performed while accessing the content, an amount of typing such based on determining a number of characters or words typed by a user while accessing the content.

Figure 7:
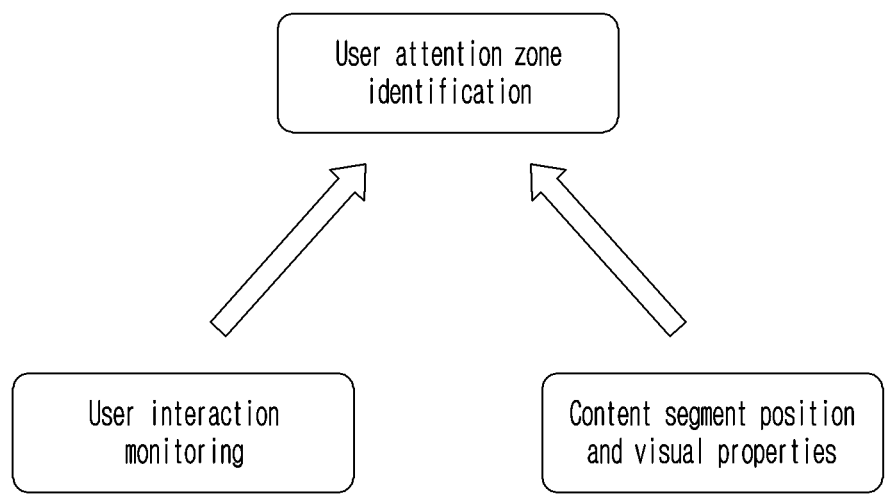
FIG. 7 illustrates an operational flow diagram depicting a process for determining a current topic of interest, according to an embodiment of the disclosure.

FIG. 7 illustrates an operational flow diagram depicting a process 700 for determining a current topic of interest, according to an embodiment of the disclosure.

Referring to FIG. 7, the current topic of interest may be determined amongst one or more topics related to the content. The current topic of interest along with other topics amongst the one or more topics may be described by a number of segments on a UI of an electronic device and may further be identified upon identification of at least two segments being accessed by the user. The current topic of interest may be determined by the user attention monitoring engine 218 as referred in the FIG. 2. The user attention monitoring engine 218 may be configured to identify one or more currently visible segments from the number of segments on the UI. Further, the user attention monitoring engine 218 may be configured to extract information associated with a position on the UI and one or more visual characteristics of each of at least two segments accessed by the user. The information associated with the position may include, and may not be limited to, dimensions of blocks presenting the content on the UI, a type of the content, a content distance from a viewport center, a content segment overlap ratio with a viewport rectangle, a content seek position with respect to a starting frame, and a content playing state for a video, and a content rendering state. The one or more visual characteristics may indicate a visibility of the at least two segments on the UI as in if a part of any of the at least two segments is overlapped, a font of the content in the at least two segments, and a size of the at least two segments.

Upon extracting the information, the user attention monitoring engine 218 may be configured to retrieve user interaction information related to a user interaction with the at least two segments in real-time. In an embodiment of the disclosure, the user interaction information may be pre-stored in the memory 204 as referred in the FIG. 2. The user interaction information may be collected by the user interaction monitoring engine 220 as referred in the FIG. 2 by monitoring the user interaction with the content. The user interaction may be based on at least one action of the user on the UI. The at least one action may include scrolling the UI, such as a backward scroll and a forward scroll at the UI, a typing of an input, skipping of one or more frames in a video comprising the content, a fast forwarding of the video, a swipe distance in a carousal view of the content, a click on a hyperlink, selecting the content, and highlighting the content.

Continuing with the above embodiment of the disclosure, the user attention monitoring engine 218 may be configured to calculate an attention importance score for each of the at least two segments based on the user interaction information, the position on the UI and the one or more visual characteristics of the at least two segments accessed by the user. Further, the user attention monitoring engine 218 may be configured to rank each of the at least two segments to select a top scoring segment. Further, the top scoring segment may be including the current topic of interest.

Figure 8:
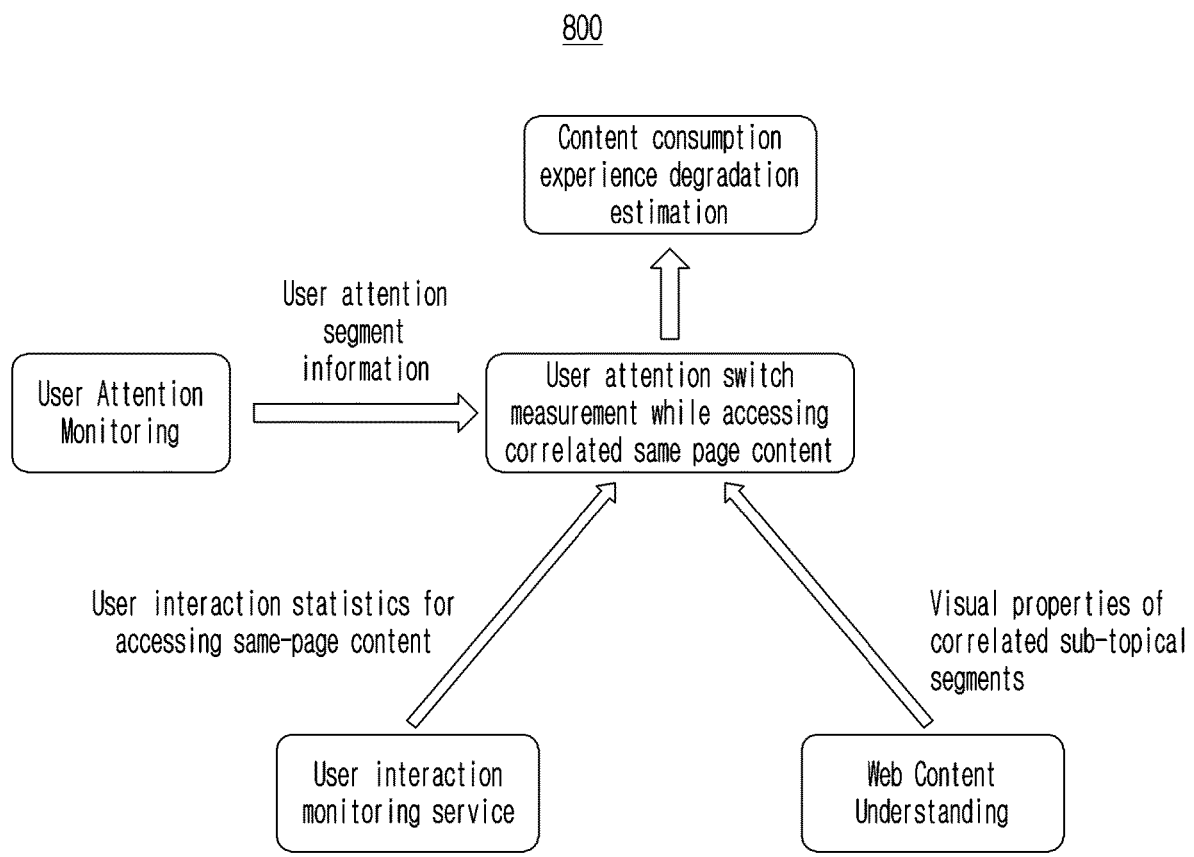
FIG. 8 illustrates an operational flow diagram depicting a process for estimating an inconvenience factor indicating an inconvenience suffered by a user while accessing content, according to an embodiment of the disclosure.

FIG. 8 illustrates an operational flow diagram 800 depicting a process for estimating an inconvenience factor indicating an inconvenience suffered by a user while accessing content, according to an embodiment of the disclosure.

Referring to FIG. 8, in an embodiment of the disclosure, the inconvenience may be suffered while accessing at least two segments of from a number of segments displaying the content or a portion of the content the user desires to access. The estimation may be calculated by the content consumption experience monitoring engine 222 as referred in the FIG. 2. The content consumption experience monitoring engine 222 may be configured to communicate with the content understanding engine 214, the user attention monitoring engine, the user interaction monitoring engine 220 as referred in the FIG. 2 for estimating the inconvenience factor. In an embodiment of the disclosure, the inconvenience may be suffered by the user due to presence of the desired content of the user on different positions of the UI. The inconvenience may be calculated based on an Equation 1 mentioned below:

$$\Sigma \alpha_i * fi > \delta (\delta = \text{inconvenience threshold}) \quad \text{Equation 1}$$

The Equation 1 may be used to calculate the inconvenience factor is calculated as a linear combination of several features contributing to a user inconvenience, such as number of backward/forward scrolls to reach the next related segment (f1), an average scroll distance between correlated content segments (f2) or the like. Values are weights related to each feature and the values may be learned from experiments with data. In an embodiment of the disclosure, the values may be decided based on empirical measurements.

Continuing with the above embodiment of the disclosure, the content consumption experience monitoring engine 222 may be configured to receive visual properties of correlated sub-topical segments. The correlated sub-topical segments may be the at least two segments amongst the number of segments correlated with one another with respect to a topic described by the at least two segments. The topic may be amongst one or more topics as referred in the FIG. 3. Further, the content consumption experience monitoring engine 222 may be configured to receive user interaction statistics for accessing the content on a page from the user interaction monitoring engine 220 and user attention segment information from the user attention monitoring engine 218. The user attention segment information indicate that the user is accessing the content of at the at least two segments and may determine a change in an attention of the user towards the at least two segments.

Subsequently, the user interaction statistics may indicate a navigational distance between the at least two segments. The navigational distance may be related to one or more of a scroll distance between the number of segments, a number of frames in a video displaying the content, a positional distance defining a gap of a number of pixel units between the number of segments, a click distance defining a number of clicks required to move across the number of segments, a search distance defining a number of characters typed to search one or more of the number of segments, and input distance defining a number of key inputs and a number of touch inputs received to access the number of segments. The navigational distance may be monitored by the content correlation ranking engine 226 as referred in the FIG. 2 by identifying a correlation between the at least two segments accessed by the user to determine if the navigational distance is greater than or equal to a pre-determined threshold for correlated content. Further, the user attention monitoring engine 218 may be configured to rank the at least two segments accessed by the user based on the correlation between the at least two segments.

Continuing with the above embodiment of the disclosure, the content consumption experience monitoring engine 222 may be configured to calculate the estimation factor by performing a user attention switch measurement while accessing the content described by topic amongst the one or more topics correlated with one another.

Figure 9A:
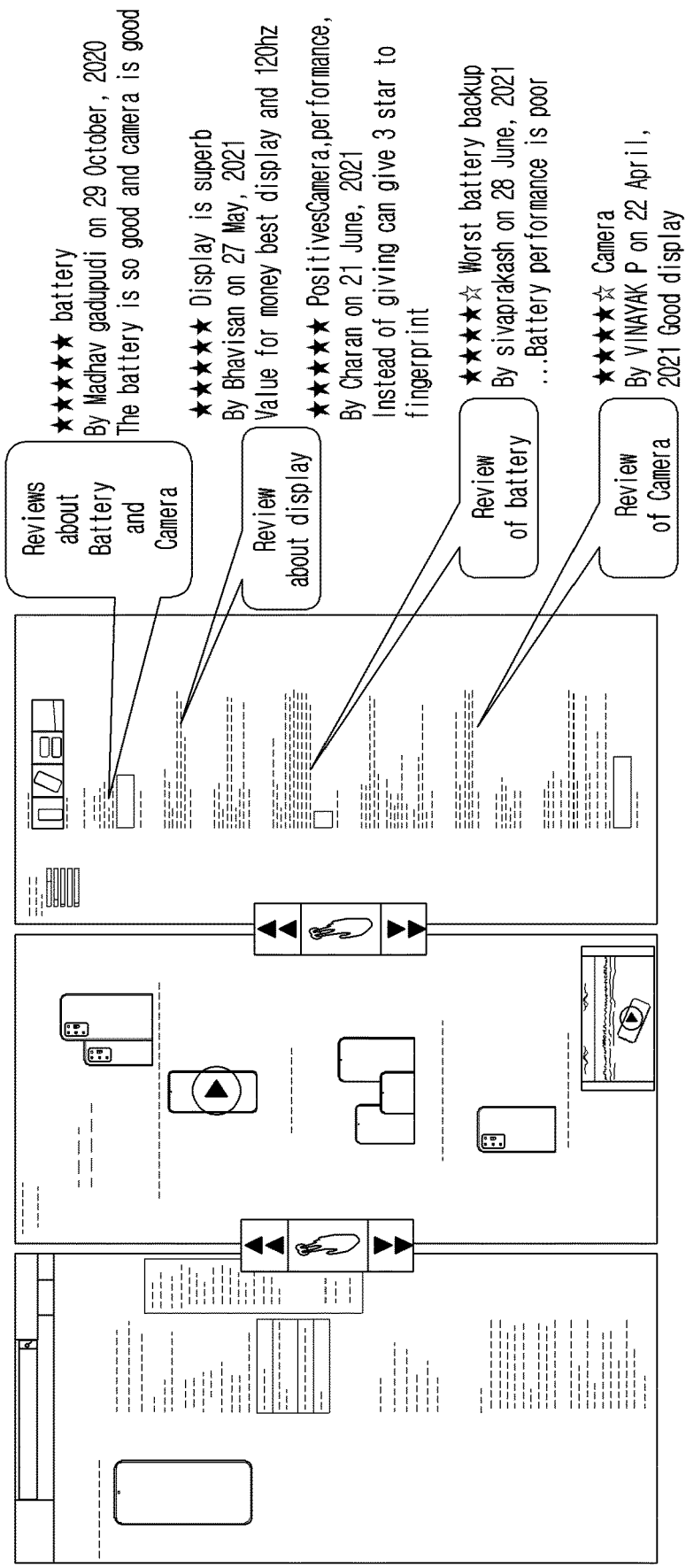
FIG. 9A illustrates a use case diagram depicting a user searching for a camera related information from a webpage, according to the related art.

FIG. 9A illustrates a use case diagram 900a depicting a user searching for a camera related information from a webpage, according to the related art.

Referring to FIG. 9A, the user is looking for the camera related information in the latest launched smartphone in an e-commerce product page. Information about camera may be scattered: specifications at the top, feature details with image/video at the middle and user reviews at the bottom, and all mixed up with other features, such as battery, display, memory, or the like, causing inconvenience for the user to scroll, navigate and search to find information related to only one feature.

Figure 9B:
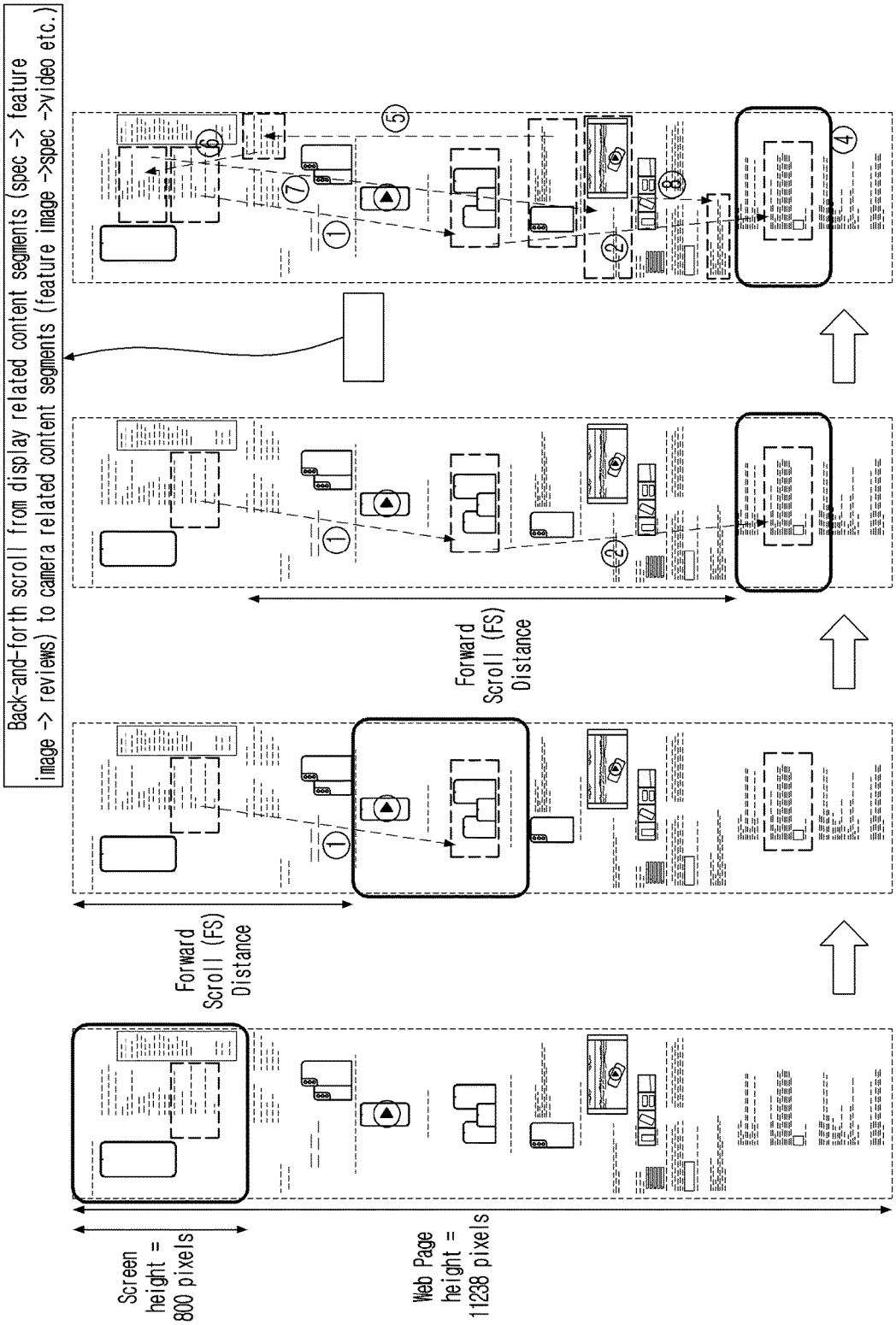
FIG. 9B illustrates a use case diagram depicting a user experiencing an inconvenience due to recurring back and forth scrolling, according to the related art.

FIG. 9B illustrates a use case diagram 900b depicting a user experiencing an inconvenience due to recurring back and forth scrolling, according to the related art.

Referring to FIG. 9B, presently, complete content of a large scrollable website may not fit in a visible screen area even on large screen devices. User performs recurring back and forth scrolling to read information about sub-topics like camera, battery, display, or the like, scattered across the page. User needs to do a lot of interactions to get individual sub-topic related content. This visual and navigational complexity causes inconvenience for the user, degrading his browsing experience.

Figure 9C:
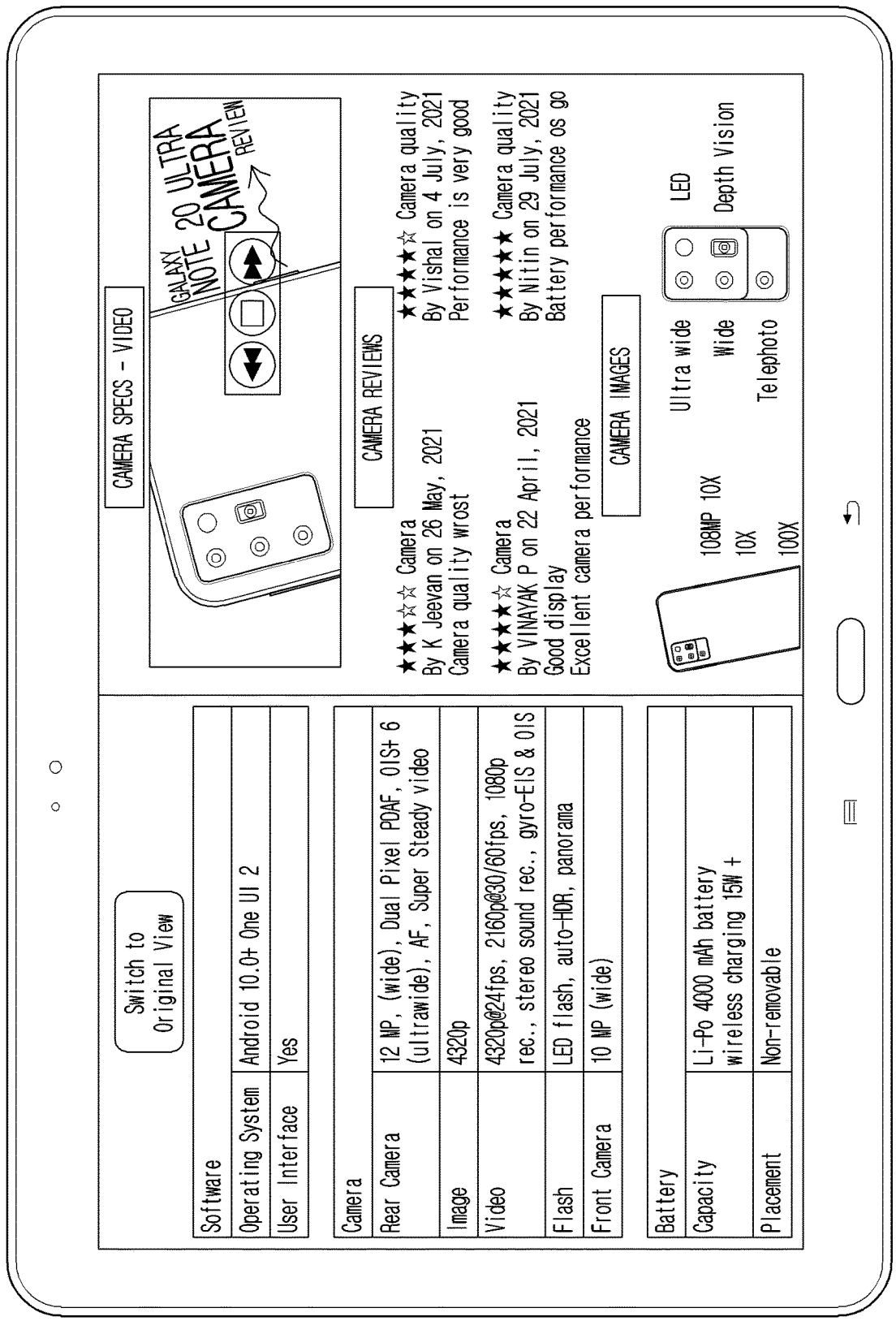
FIG. 9C illustrates a use case diagram depicting the user searching for a camera related information from the webpage, according to an embodiment of the disclosure.

FIG. 9C illustrates a use case diagram 900c depicting the user searching for a camera related information from the webpage, according to an embodiment of the disclosure.

Referring to FIG. 9C, a system in an electronic device displaying the webpage identifies presence of multiple sub-topics, such as camera, battery, display, or the like, under main topic 'Smartphone' and detects segments belonging to each sub-topic. A 'Correlated View' or a "Product feature view' option is displayed to access the information about individual features in one place. After switching to the correlated view, as soon as the user starts focusing on 'Camera' related segment, the system brings other segments about the same feature "camera' from other parts, such as specification, feature description, and reviews of the same page and shows them nearby. Now the user need not search for individual feature information across the whole page.

Figure 9D:
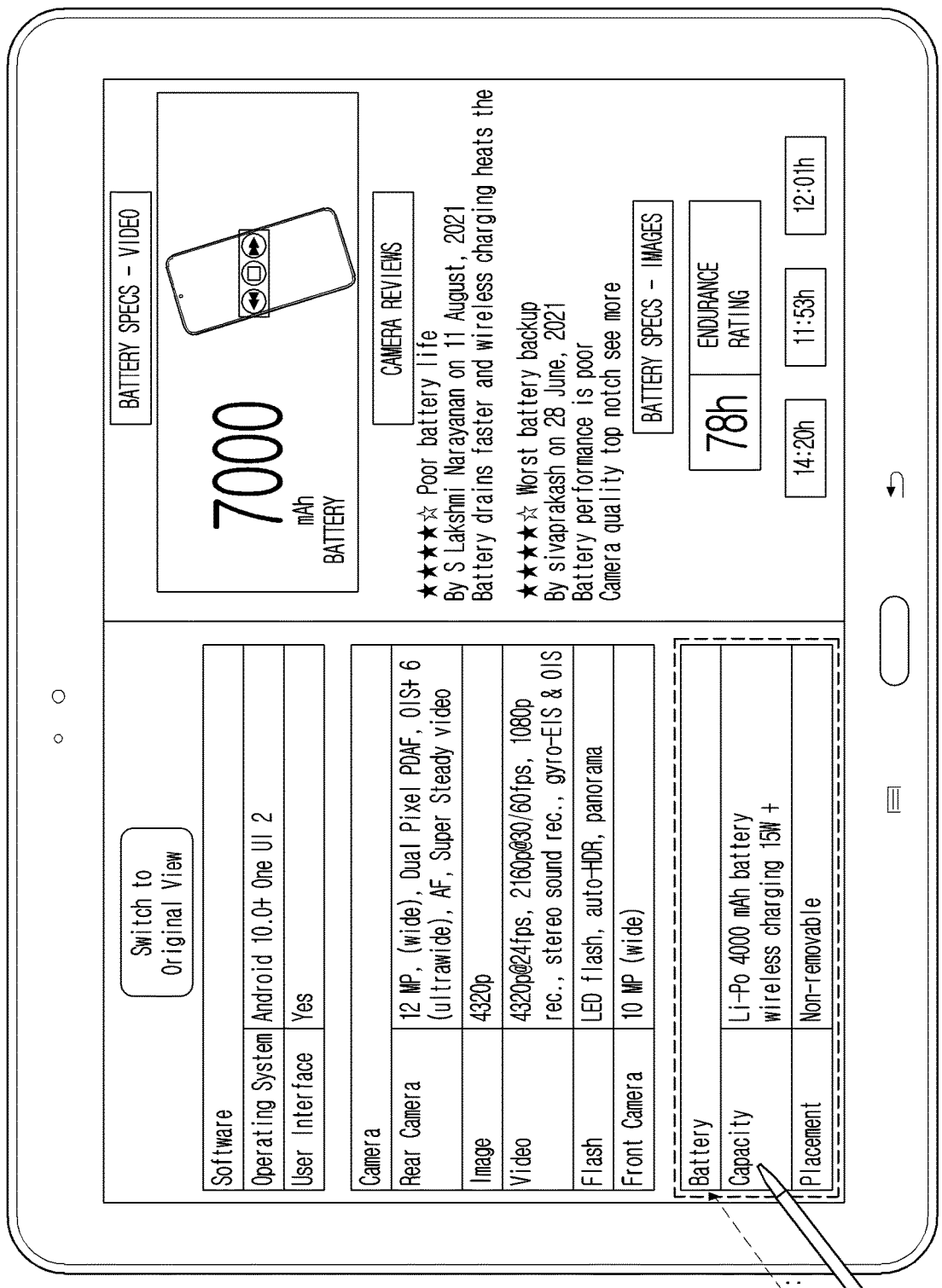
FIG. 9D illustrates a use case diagram depicting the user searching for a camera related information from the webpage and a switch in an attention of the user causing a change in a UI, according to an embodiment of the disclosure.

FIG. 9D illustrates a use case diagram 900d depicting the user searching for a camera related information from the webpage and a switch in an attention of the user causing a change in a UI, according to an embodiment of the disclosure.

Referring to FIG. 9D, in an embodiment of the disclosure, where it is determined that the attention of the user switches from one feature another, such as from 'camera specs' to 'battery specs' on the same page content, Battery related segments and portions are brought closer for easier and parallel viewing of matching topics.

Figure 10:
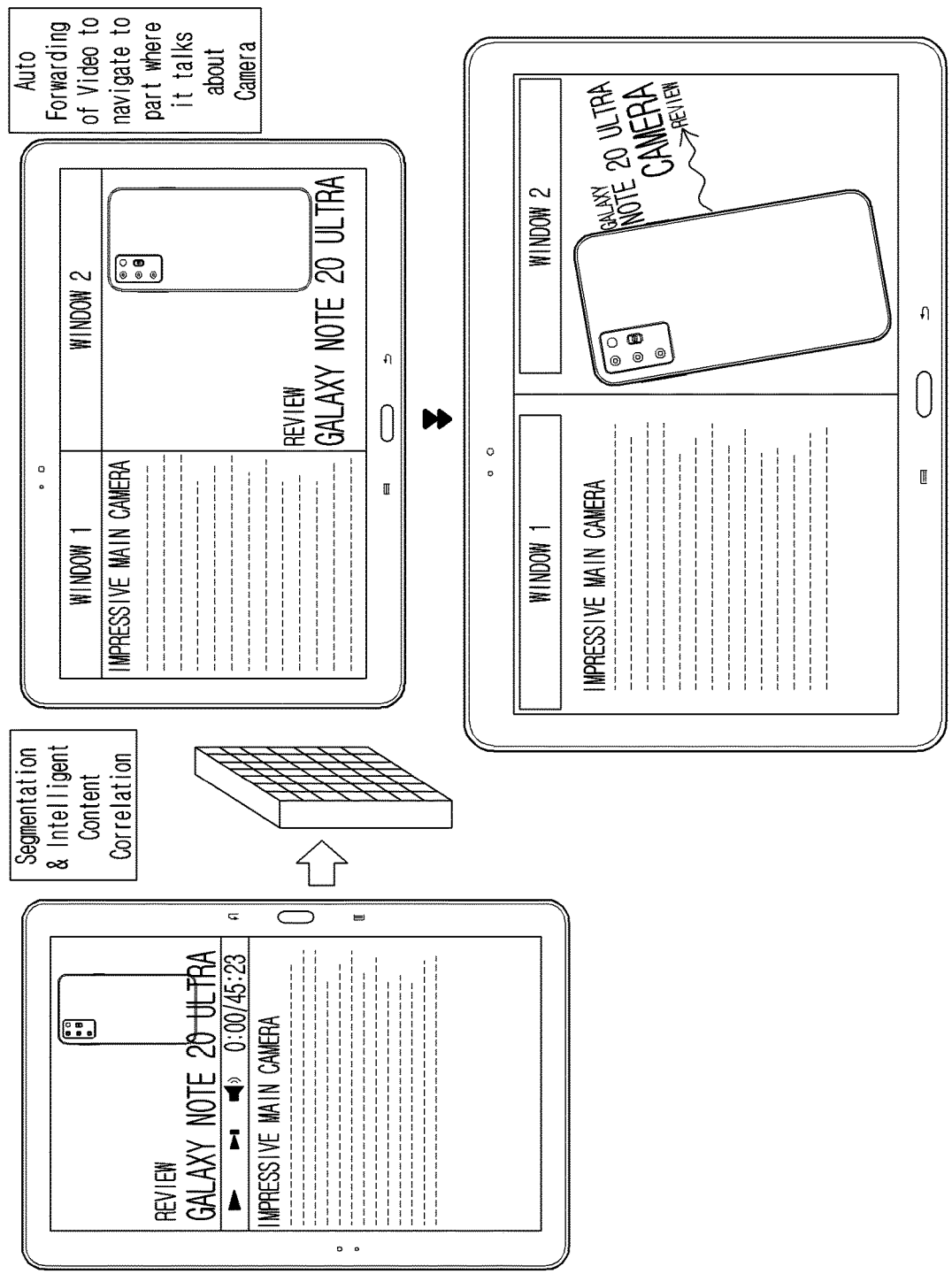
FIG. 10 illustrates another use case diagram depicting an auto-navigating multimedia content in correlation with textual description, according to an embodiment of the disclosure.

FIG. 10 illustrates another use case diagram 1000 depicting an auto-navigating multimedia content in correlation with textual description, according to an embodiment of the disclosure.

Referring to FIG. 10, the user may open a product review website including videos of product feature review as well as review article content. Window 1 may depict that a user attention is at a camera section for a smartphone of the review blog description. Window 2 may indicate that the user is starting to watch review video. Further, a context of user from the window 1 and navigated user in the window 2 having video element may be mapped to a portion having information related to the camera.

Figure 11A:
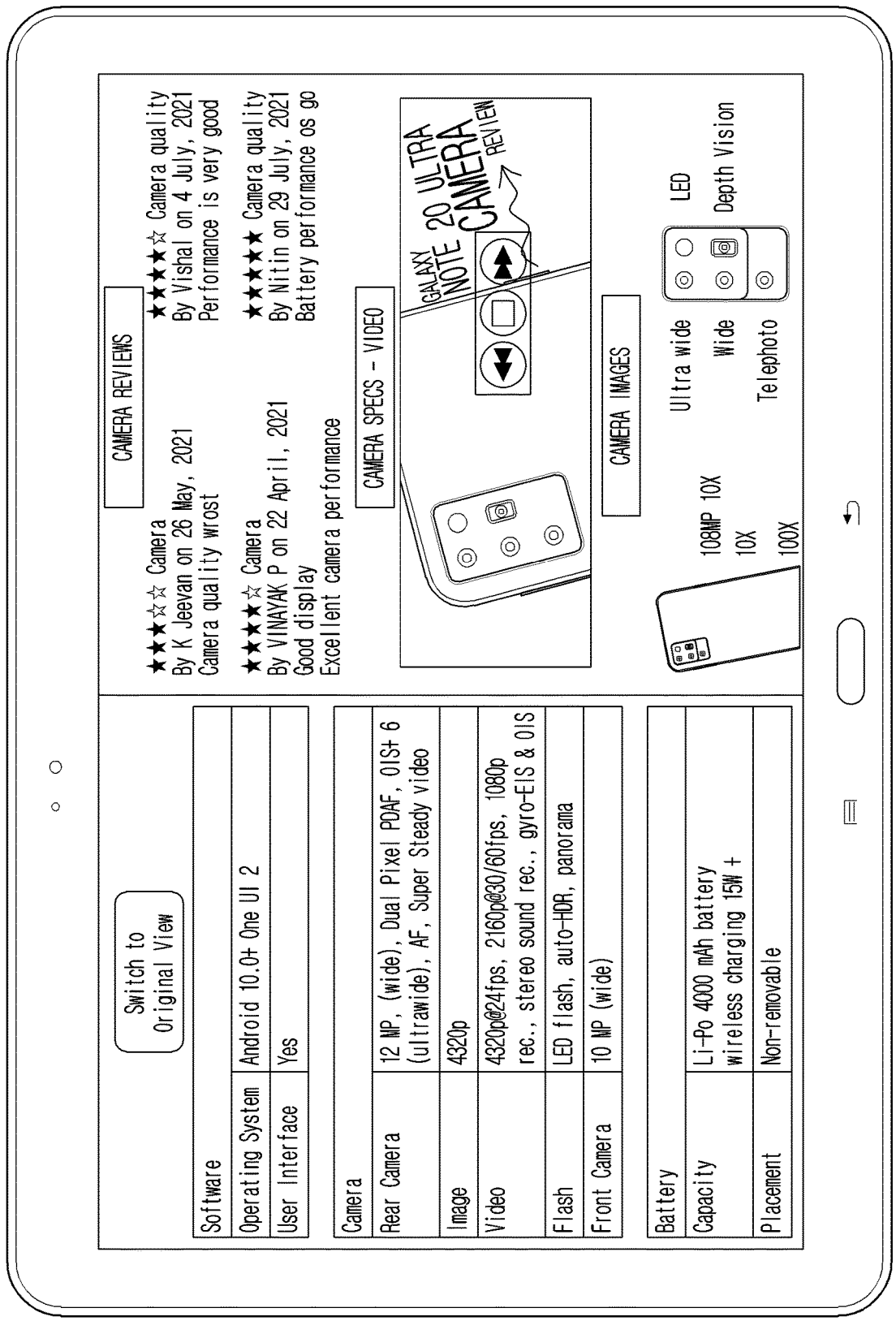
FIG. 11A illustrates a use case diagram depicting a modified view of a UI with a modification occurring due to a change in an attention of a user, according to an embodiment of the disclosure.

FIG. 11A illustrates a use case diagram 1100a depicting a modified view of a UI with a modification occurring due to a change in an attention of a user, according to an embodiment of the disclosure.

Referring to FIG. 11A, in an embodiment of the disclosure, where it is determined that the attention of the user is changing towards information related to one or more features of a camera in a smartphone, the modified view if the UE is generated depicting the information associated with the one or more features of the camera with one another. The modified view of the UI includes a changed ordering of segments comprising the information associated with the camera. In an embodiment of the disclosure, the modified view may be generated based on one or more user preferences learnt from past interactions of the user.

Figure 11B:
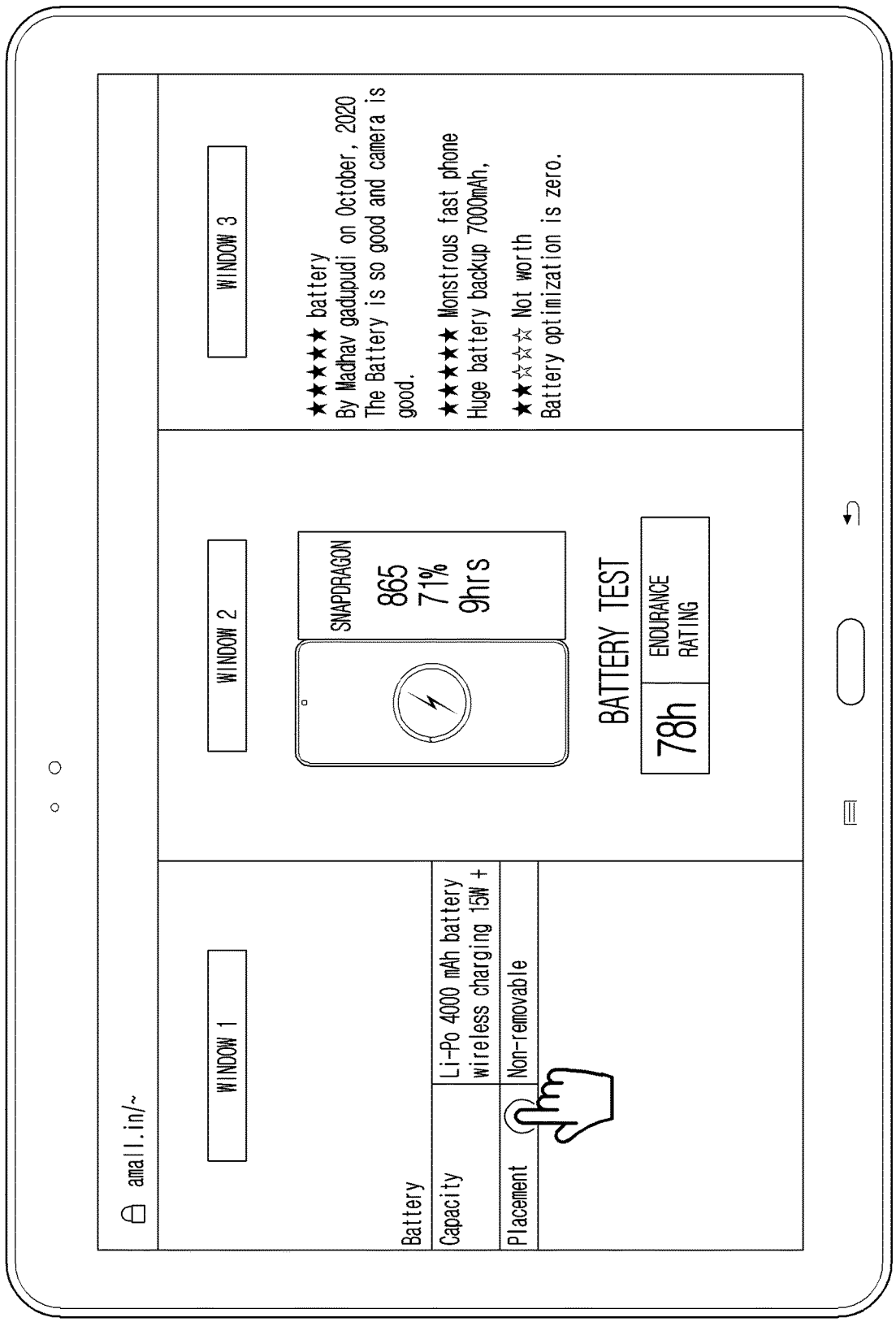
FIG. 11B illustrates a use case diagram depicting the modified view of the UI, according to an embodiment of the disclosure.

FIG. 11B illustrates a use case diagram 1100b depicting the modified view of the UI, according to an embodiment of the disclosure.

Referring to FIG. 11 the modified view includes three parallel windows with 2 segments brought closer to a current segment as they match with a current topic of attention (i.e., battery).

FIG. 12 illustrates a flow diagram depicting a method 1200 for improving user experience for accessing content on a user interface (UI) of an electronic device, according to an embodiment of the disclosure.

Referring to FIG. 1, the method 1200 may be implemented by the system 102 using components thereof, as described above. in an embodiment of the disclosure, the method 1200 may be executed by the content understanding engine 214, the sub-topical semantic segmentation engine 216, the user attention monitoring engine 218, the user interaction monitoring engine 220, the content consumption experience monitoring engine 222, the content rendering engine 224, and the content correlation ranking engine 226. Further, for the sake of brevity, details of the disclosure that are provided in the description of FIGS. 1, 2, 3, 4A, 4B, 5A, 5B, 5C, 6, 7, 8, 9A, 9B, 9C, 9D, and 10 are not provided in the description of FIG. 12.

At operation 1202, the method includes identifying a plurality of segments associated with content being accessed by the user on the UI of the electronic device in real-time.

At operation 1204, the method includes, recognizing one or more topics of the content in each of the plurality of segments.

At operation 1206, the method includes, determining a current topic of interest from the one or more topics of the content by monitoring a user interaction associated with at least two segments from the plurality of segments.

At operation 1208, the method includes, generating a modified view of the UI comprising a plurality of portions associated with the current topic of interest from the at least two segments, wherein the plurality of portions is displayed within a predefined threshold distance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for improving user experience for accessing content on a user interface (UI) of an electronic device, the method comprising:
    identifying a plurality of segments associated with content being accessed by a user on the UI of the electronic device in real-time;
    recognizing one or more topics of the content in each of the plurality of segments;
    determining a current topic of interest from the one or more topics of the content by monitoring a user interaction associated with at least two segments from the plurality of segments;
    estimating an inconvenience factor indicating an inconvenience suffered by the user while accessing the at least two segments of the UI; and
    generating a modified view of the UI comprising a plurality of portions associated with the current topic of interest from the at least two segments,
    wherein the plurality of portions is displayed within a predefined threshold distance.

2. The method of claim 1, wherein the determining of the current topic of interest comprises:
    extracting information associated with a position on the UI and one or more visual characteristics of each of the at least two segments accessed by the user; and
    retrieving user interaction information associated with the user interaction with the at least two segments in real-time.

3. The method of claim 2, further comprising:
    calculating an attention importance score for each of the at least two segments based on the user interaction information, and the position and the one or more visual characteristics of each of the at least two segments accessed by the user; and
    ranking each of the at least two segments to select a top scoring segment,
    wherein the top scoring segment comprises the current topic of interest.

4. The method of claim 1, wherein the monitoring of the user interaction with the content comprises:
    identifying the at least two segments amongst the plurality of segments being accessed by the user by monitoring at least one user gesture while accessing the content.

5. The method of claim 4, wherein the estimating of the inconvenience factor comprises:
    determining a change in an attention of the user towards the at least two segments;
    monitoring a navigational distance between the at least two segments, wherein the navigational distance indicates a level of a user effort in performing the user interaction associated with the at least two segments; and
    estimating the inconvenience factor when the navigational distance between the at least two segments is greater than or equal to a pre-determined threshold.

6. The method of claim 5, wherein the navigational distance is associated with one or more of a scroll distance between the plurality of segments, a number of frames in a video displaying the content, a positional distance defining a gap of a number of pixel units between the plurality of segments, a click distance defining a number of clicks required to move across the plurality of segments, a search distance defining a number of characters typed to search one or more of the plurality of segments, and input distance defining a number of key inputs and a number of touch inputs received to access the plurality of segments.

7. The method of claim 6, wherein the monitoring of the navigational distance between the at least two segments comprises:
    identifying a correlation between the at least two segments accessed by the user to determine if the navigational distance is greater than or equal to the pre-determined threshold; and ranking the at least two segments accessed by the user based on the correlation between the at least two segments.

8. The method of claim 7, wherein the generating of the modified view is based on the ranking of the at least two segments such that the plurality of portions associated with the current topic of interest of the user are displayed within the predefined threshold distance on the UI.

9. The method of claim 8, further comprising:
identifying the at least two segments comprising the current topic of interest accessed by the user;
fetching a list comprising the ranking of the at least two segments and context information, wherein the context information indicates a content preference and an order preference of the user for each of the plurality of segments; and
updating segment information associated with the plurality of segments based on the content preference and the order preference of the user.

10. The method of claim 9, further comprising:
re-ranking the at least two segments upon updating the segment information; and
generating the modified view by personalizing the UI based on the re-ranking of the at least two segments.

11. The method of claim 10, further comprising:
dynamically monitoring a change in a user attention while accessing the content of the at least two segments; and
re-calculating an updated attention importance score for each of the at least two segments.

12. The method of claim 11, further comprising:
re-ranking the at least two segments based on the updated attention importance score for each of the at least two segments; and
updating the modified view by personalizing the UI based on the re-ranking of the at least two segments.

13. The method of claim 12, further comprising:
monitoring user feedback associated with at least one of a content preference, an order preference and the modified view;
refining one or more parameters associated with at least one of the rankings of the at least two segments and one of the modified view and the updated modified view of the at least two segments; and
updating the modified view by personalizing the UI based on the refined one or more parameters.

14. The method of claim 7, wherein the ranking of the at least two segments accessed by the user based on the correlation between the at least two segments is determined based on a correlation score.

15. The method of claim 14, wherein the correlation score is determined using a correlation matrix.

16. The method of claim 1,
wherein the user interaction is based on at least one action of the user on the UI, and
wherein the at least one action comprises:
scrolling the UI, wherein the scrolling includes a backward scroll and a forward scroll at the UI, a typing of an input,
skipping of one or more frames in a video comprising the content, a fast forwarding of the video, a swipe distance in a carousal view of the content, a click on a hyperlink,
selecting the content, and
highlighting the content.

17. The method of claim 1, wherein the recognizing of the one or more topics is based on performing at least one of:
a semantic analysis of the content;
a classification of the content into a set of pre-defined topics; and
a mapping of the content onto a pre-defined ontology of topics associated with the content.

18. The method of claim 1, wherein the modified view of the UI comprising the plurality of portions associated with the current topic of interest from the at least two segments comprises a view displaying the at least two segments in a manner such that a user is able to concurrently view the at least two segments.

19. A system for improving user experience for accessing content on a user interface (UI) of an electronic device, the system comprising:
memory, comprising one or more storage media, storing instructions; and
one or more processors communicatively coupled to the memory,
wherein the instructions, when executed by the one or more processors individually or collectively, cause the system to:
identify a plurality of segments associated with content being accessed by a user on the UI of the electronic device in real-time;
recognize one or more topics of the content in each of the plurality of segments;
determine a current topic of interest from the one or more topics of the content by monitoring a user interaction associated with at least two segments from the plurality of segments, and
estimate an inconvenience factor indicating an inconvenience suffered by the user while accessing the at least two segments of the UI; and
generate a modified view of the UI comprising a plurality of portions associated with the current topic of interest from the at least two segments,
wherein the plurality of portions is displayed within a predefined threshold distance.

20. The system of claim 19, wherein the instructions, when executed by the one or more processors individually or collectively, further cause the system to:
extract information associated with a position on the UI and one or more visual characteristics of each of the at least two segments accessed by the user, and
retrieve user interaction information associated with the user interaction with the at least two segments in real-time.

21. The system of claim 20, wherein the instructions, when executed by the one or more processors individually or collectively, further cause the system to:
calculate an attention importance score for each of the at least two segments based on the user interaction information, and the position and the one or more visual characteristics of each of the at least two segments accessed by the user, and
rank each of the at least two segments to select a top scoring segment,
wherein the top scoring segment comprises the current topic of interest.

22. The system of claim 19 wherein the instructions, when executed by the one or more processors individually or collectively, further cause the system to:
identify the at least two segments amongst the plurality of segments being accessed by the user by monitoring at least one user gesture while accessing the content.

23. The system of claim 22, wherein the instructions, when executed by the one or more processors individually or collectively, further cause the system to:

determine a change in an attention of the user towards the at least two segments, monitor a navigational distance between the at least two segments, wherein the navigational distance indicates a level of a user effort in performing the user interaction associated with the at least two segments, and estimate the inconvenience factor when the navigational distance between the at least two segments is greater than or equal to a pre-determined threshold.

* * * * *